(12) United States Patent
Pretorius et al.

(10) Patent No.: US 9,316,892 B2
(45) Date of Patent: *Apr. 19, 2016

(54) PROJECTION DEVICE

(71) Applicant: Carl Zeiss AG, Oberkochen (DE)

(72) Inventors: Marco Pretorius, Oberkochen (DE); Guenter Rudolph, Jena (DE); Enrico Geissler, Jena (DE); Christoph Nieten, Jena (DE)

(73) Assignee: Carl Zeiss AG, Oberkochen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/754,917

(22) Filed: Jun. 30, 2015

(65) Prior Publication Data

US 2015/0301436 A1    Oct. 22, 2015

Related U.S. Application Data

(63) Continuation of application No. 14/036,244, filed on Sep. 25, 2013, now Pat. No. 9,097,967.

(30) Foreign Application Priority Data

Sep. 25, 2012 (DE) .......................... 10 2012 217 329

(51) Int. Cl.
| *G03B 21/26* | (2006.01) |
| *H04N 5/74* | (2006.01) |
| *G02F 1/00* | (2006.01) |
| *G03B 21/14* | (2006.01) |
| *G02B 27/00* | (2006.01) |
| *G02B 17/08* | (2006.01) |
| *H04N 9/31* | (2006.01) |
| *G03B 21/00* | (2006.01) |
| *G02B 26/08* | (2006.01) |

(52) U.S. Cl.
CPC .......... *G03B 21/147* (2013.01); *G02B 17/0856* (2013.01); *G02B 27/0025* (2013.01); *G03B 21/008* (2013.01); *G03B 21/142* (2013.01); *H04N 9/3126* (2013.01); *G02B 26/0833* (2013.01)

(58) Field of Classification Search
CPC .. G03B 21/008; G03B 21/006; G03B 21/147; G03B 21/14; G03B 21/28; G03B 21/2066; H04N 5/7458; H04N 9/3126
USPC .................. 348/758, 771; 353/30, 88, 89, 90
See application file for complete search history.

(56) References Cited

U.S. PATENT DOCUMENTS 9,097,967 B2 *   8/2015   Pretorius et al.

* cited by examiner

*Primary Examiner* — William C Dowling
*Assistant Examiner* — Ryan Howard
(74) *Attorney, Agent, or Firm* — Skaar Ulbrich Macari, P.A.

(57) ABSTRACT

A projection device includes a first and a second tilting mirror matrix, each including a plurality of tilting mirrors. A cover glass covers the tilting mirrors. An imaging lens system includes a relay lens system which images the tilting mirrors of the first tilting mirror matrix onto the tilting mirrors of the second tilting mirror matrix. Thus light reflected by the tilting mirrors of the first tilting mirror matrix onto tilting mirrors of the second tilting mirror matrix, and a projection lens system, which projects light reflected by tilting mirrors of the second tilting mirror matrix, in order to produce an image, is provided. The imaging lens system further includes a correction element which corrects at least one image error caused by the light obliquely passing through the cover glasses.

17 Claims, 14 Drawing Sheets

PROJECTION DEVICE

PRIORITY

This application is a continuation of U.S. patent application Ser. No. 14/036,244, filed Sep. 25, 2013, which claims priority to German Patent Application No. 102012217329.3, filed on Sep. 25, 2012. Both of the foregoing applications are hereby incorporated herein by reference in their entirety.

FIELD

The present invention relates to a projection device with a first and a second tilting mirror matrix, an imaging lens system, which images the first tilting mirror matrix onto the second tilting mirror matrix, and a projection lens system, which projects light reflected by the second tilting mirror matrix, in order to produce an image.

BACKGROUND

In conventional projection devices, to achieve good image qualities in the projected image, it is important to carry out an imaging of the first tilting mirror matrix onto the second tilting mirror matrix that is precise and as error-free as possible. However, it has been shown that, even if imaging lens systems that theoretically produce an extremely precise 1:1 imaging are used, image errors still occur.

SUMMARY

Starting from here, an object of certain embodiments of the invention is to develop a projection device with a first and a second tilting mirror matrix, an imaging lens system, which images the first tilting mirror matrix onto the second tilting mirror matrix, and a projection lens system, which projects light reflected by the second tilting mirror matrix, in order to produce an image, such that the projected image has an improved quality.

According to certain embodiments of the invention, the object is achieved by a projection device comprising a first and a second tilting mirror matrix, which each have a plurality of tilting mirrors and a cover glass covering the tilting mirrors, an imaging lens system, which has a relay lens system which images the tilting mirrors of the first tilting mirror matrix onto the tilting mirrors of the second tilting mirror matrix and thus light reflected by tilting mirrors of the first tilting mirror matrix onto tilting mirrors of the second tilting mirror matrix, and a projection lens system, which projects light reflected by tilting mirrors of the second tilting mirror matrix (in particular onto a projection surface), in order to produce an image, wherein the imaging lens system further has a correction element which corrects at least one image error caused by the light obliquely traversing the cover glasses.

The inventors have found that the oblique passage through the cover glasses of the tilting mirror matrices leads to undesired aberrations in the imaging by means of the imaging lens system. Thus, when the cover glasses are obliquely passed through (with the exception of higher-order image errors) precisely the following image errors form: chromatic magnification difference, (axial) coma, (axial) astigmatism and distortion. All of these image errors have the effect that a pixel-accurate allocation between the first and the second tilting mirror matrix no longer exists or that there is an undesired lateral deviation on the second tilting mirror matrix. This effect has the result that, if an imaging lens system that carries out a highly precise 1:1 imaging is used, image errors still occur in undesired manner and the stray light reduction functions less perfectly. It is also not possible to dispense with the cover glasses, and they must have a substantial thickness of typically several millimetres because the tilting mirrors are under vacuum and the cover glasses must withstand the pressure difference between normal pressure and vacuum.

The effect of the image errors that occur due to the oblique travel through the cover glasses on the image quality of the projected image can be characterized as follows. The lack of pixel-accurate allocation generally leads to a contrast degradation in the projection imaging (in the projected image). This error is clear in particular in images with high in-image contrasts, as the deviation from the pixel-accurate allocation is normally field-dependent (including a drop in brightness towards the edge). The chromatic magnification difference results in the colour-dependent occurrence of more or less scattered light in the projection imaging. Because of the field dependence of this error, colour fringes can result here towards the edge.

Due to the discovery of this error source, of the oblique passage through the cover glasses, as well as due to the provision of a corresponding correction element, a projection device is provided according to the invention, in which the projected image has an improved quality because, according to the invention, all of the specified image errors that occur as a result of the oblique passage through the cover glasses can be corrected or reduced at the same time.

In the projection device according to certain embodiments of the invention, the relay lens system can have an optical axis, the central points of the tilting mirrors of each tilting mirror matrix can each lie in one DMD plane and the tilting mirror matrices can be positioned such that the DMD planes in each case enclose an angle not equal to 90° with the optical axis. In particular, the two tilting mirror matrices can be positioned such that the two DMD planes coincide. In this arrangement, a particularly good imaging can be produced by means of the monocentric optics unit.

The relay lens system can be formed as a monocentric optics unit. The monocentric optics unit is meant here, in certain embodiments, to be an optical system in which all (refractive and/or reflective) effective surfaces are arranged concentrically around a common centre of curvature.

By a relay lens system according to certain embodiments can be a lens system which images a surface element, which is perpendicular to the axis, inverted onto itself. However, it is also possible to form the relay lens system unfolded such that the imaging of the surface element onto itself is no longer present, but would be present without the unfolding. The monocentric optics unit images a whole volume element around the common centre of curvature (inverted) into itself. The monocentric optics unit can, naturally, also be formed such that the imaging of the volume element into itself would be present without the unfolding. The DMD planes obliquely arranged to the optical axis of the monocentric optics unit or of the relay lens system can thereby be imaged onto one another, if the influence of the cover glasses is disregarded, distortion-free and with a good wavefront quality. The image errors occurring in practice because of the light obliquely passing through the cover glasses (or passing through the cover glasses at an angle) are corrected according to the invention with the correction element. In particular for image contents that have a spatially close change in the colours and/or brightnesses, field-dependent brightness alterations or colour alterations occur. Thus, for example, in the representation of individual, white pixels on a black background, both the brightnesses and the colours of the "white" pixels change over the image. In the ideal case, the described field-dependent brightness alterations or colour alterations can be reduced or suppressed by correction or reduction of the image errors to such an extent that they are no longer perceptible.

The relay lens system or the monocentric optics unit can be formed in particular embodiments as a 1:1 imaging lens system.

The correction element in certain embodiments can include a curved surface, which is formed as a free-form surface, the curvature of which runs differently in two sections running perpendicular to one another and changes depending on the position on the surface.

Furthermore, the correction element can be formed in certain embodiments as a refractive element. The refractive element can include a locally varying thickness which is chosen such that the desired correction is effected. This can be achieved in particular in that, by means of the refractive element, an error opposed to the error brought about through the cover glasses or an opposing error of almost equal size is caused, with the result that the desired correction is thereby achieved.

Furthermore, one surface of the refractive element can e.g. be formed in certain embodiments as a free-form surface, the curvature of which runs differently in two sections running perpendicular to one another and changes depending on the position on the surface. The other surface can e.g. be spherically curved, planar, aspherical or in the same way as the one surface formed as a free-form surface.

The relay lens system or the monocentric optics unit according to certain embodiments can include a mirror, with a curved mirror surface, which is formed by a metallized side of the refractive element. Furthermore the projection device can have two refractive elements, which carry out the desired correction. In this case, the relay lens system or the monocentric optics unit can e.g. have two mirrors with in each case a curved mirror surface which is formed in each case by a metallized side of one of the two refractive elements. Naturally, the at least one refractive element can be a separate component, with the result that the at least one mirror in the relay lens system or in the monocentric optics unit for its part is a separate component.

The at least one refractive correction element according to certain embodiments can be positioned such that it is passed through precisely once or precisely twice by the light that is imaged from the first tilting mirrors onto the second tilting mirrors by means of the relay lens system or the monocentric optics unit.

The relay lens system or the monocentric optics unit according to certain embodiments can have a primary mirror with a concave spherical mirror surface and a secondary mirror with a convex spherical mirror surface.

In addition, the relay lens system or the monocentric optics unit according to certain embodiments can be formed as a purely reflective optics unit, as a purely refractive optics unit or as a catadioptric optics unit.

In particular, the correction element according to certain embodiments can be formed as a reflective element. A chromatic image error correction can also be carried out with such a reflective element, as long as the relay lens system or the monocentric optics unit contains at least one refractive element. In this case, by means of the reflective correction element which is preferably arranged near the field, the beam path through the refractive part of the relay lens system or the monocentric optics unit is altered in a targeted manner depending on the field beam angle such that the hereby-induced chromatic aberrations of the refractive element (or the corresponding refractive surfaces) of the relay lens system or the monocentric optics unit reduce the chromatic aberrations of the cover glasses, whereby the quality of the projected image is in turn improved.

If the relay lens system is formed for example as a catadioptric lens system, for example one mirror of the relay lens system can be designed as a free-form surface. In this case, the correction element is integrated into the mirror of the relay lens system and thus is not a separate component. The free-form portion, thus the deviation from the e.g. spherical basic shape of the mirror, in this case virtually forms the correction element.

In addition, the imaging lens system and/or the relay lens system or the monocentric optics unit according to certain embodiments can be formed mirror-symmetrical to precisely one symmetry plane.

The refractive element according to certain embodiments can be formed as a separate refractive element.

In addition, it is possible for the relay lens system or the monocentric optics unit according to certain embodiments to include two mirrors, wherein one of the two mirrors is formed as a concave mirror and the other of the two mirrors is formed as a convex mirror and the beam path runs from the first tilting mirror matrix, via the concave mirror, to the convex mirror and in turn via the concave mirror to the second tilting mirror matrix.

The refractive element according to certain embodiments can be formed in particular as an achromatic cemented group.

In particular, the projection device according to certain embodiments of the invention has precisely two (e.g. spherically) curved mirrors. In addition, the projection device according to the invention can contain still further planar reflecting mirrors.

Furthermore, the projection device according to certain embodiments of the invention can include a control unit for operating the projection device, a light source (single- or multi-coloured) for illuminating the first tilting mirror matrix as well as other elements known to a person skilled in the art which are necessary for operating the projection device.

A projection device comprising a first and a second tilting mirror matrix, an imaging lens system, which images the first tilting mirror matrix onto the second tilting mirror matrix, and a projection lens system, which images the second tilting mirror matrix (in particular onto a projection surface), in order to produce an image, is furthermore provided in certain embodiments, wherein the imaging lens system has two curved mirrors and one refractive element with at least one curved surface, wherein of the two curved mirror surfaces and the curved refractive surface at least one surface is formed as a free-form surface, the curvature of which runs differently in two sections running perpendicular to one another and changes depending on the position on the surface.

Furthermore, a projection device comprising a first and a second tilting mirror matrix, an imaging lens system, which images the first tilting mirror matrix onto the second tilting mirror matrix, and a projection lens system, which images the second tilting mirror matrix (in particular onto a projection surface), in order to produce an image, is provided in certain embodiments, wherein the imaging lens system has two curved mirrors with a curved mirror surface in each case, wherein at least one of the two mirror surfaces is formed as a free-form surface, the curvature of which runs differently in two sections running perpendicular to one another and changes depending on the position of the mirror surface.

The imaging lens system of the two further projection devices according to certain embodiments can be formed in particular such as has already been described.

It is understood that the features mentioned above and those yet to be explained in the following are applicable, not only in the stated combination, but also in other combinations or singly, without departure from the scope of the present invention.

BRIEF DESCRIPTION OF THE DRAWINGS

The invention is explained in further detail below by way of example with reference to the attached drawings which also disclose features essential to the invention.

FIGS. 6 and 7 are representations of image errors of the projection device from FIGS. 3-5;

DETAILED DESCRIPTION

The present invention can be explained with reference to the following example embodiments. However, these example embodiments are not intended to limit the present invention to any specific examples, embodiments, environments, applications or implementations described in these embodiments. Therefore, description of these embodiments is only for purpose of illustration rather than to limit the present invention.

Figure 1:
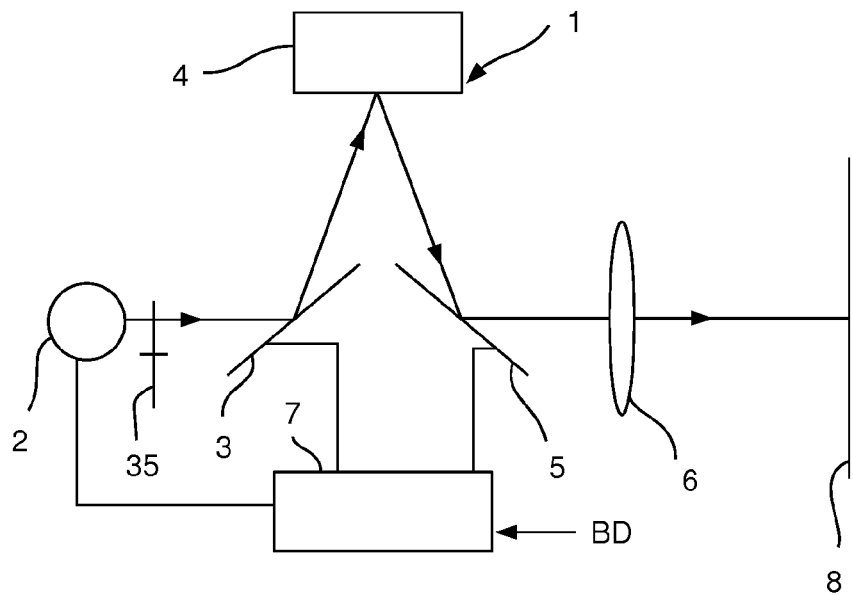
FIG. 1 is a schematic view of an embodiment of the projection device according to the invention.

Referring to FIG. 1, the projection device 1 for projecting an image comprises a light source 2, an illumination modulator 3, an imaging lens system 4, an image modulator 5, a projection lens system 6 as well as a control unit 7. The two modulators 3, 5 are in each case formed as a tilting mirror matrix having n×m tilting mirrors (or micromirrors) in columns and rows, wherein the tilting mirrors can, independently of one another, be brought into a first and into a second tilting position. The two tilting mirror matrices 3, 5 can be formed identical and/or have the same number and arrangement of tilting mirrors.

The imaging lens system 4 is formed as a 1:1 imaging lens system and images each tilting mirror of the illumination modulator 3 precisely onto one tilting mirror of the image modulator 5, with the result that precisely one tilting mirror of the image modulator 5 is allocated to each tilting mirror of the illumination modulator 3. Other allocations of the tilting mirrors are also possible. Thus, for example, an offset in the direction of the rows can be provided such that each tilting mirror of the image modulator 5 is illuminated by two tilting mirrors (half each) of the illumination modulator 3.

The two modulators 3 and 5 are controlled by the control unit 7 based on fed-in image data BD such that the illumination modulator 3 which is struck by the light (e.g. white light) from the light source 2 is a 2-dimensionally modulated light source for the image modulator 5 with which the image to be projected is generated or modulated and can then be projected onto a projection surface 8 by means of the projection lens system 6.

The illumination modulator 3 can be controlled such that only the light that is reflected by the tilting mirrors of the illumination modulator, which are allocated to image pixels, which are not black, (or the corresponding tilting mirrors) of the image modulator 5, is imaged onto the image modulator 5. It can thereby be achieved that image pixels or tilting mirrors of the image modulator 5 which are to represent black image points are not struck by light (because the allocated tilting mirrors of the illumination modulator 3 or the light reflected by this tilting mirror is not imaged onto the image modulator 5). This has the advantageous result that the black level (the undesired residual brightness of a black image point in the actual projected image) can be clearly reduced.

The light modulation of the two tilting mirror matrices 3 and 5 is explained in more detail in connection with the schematic representation in FIG. 2.

Figure 2:
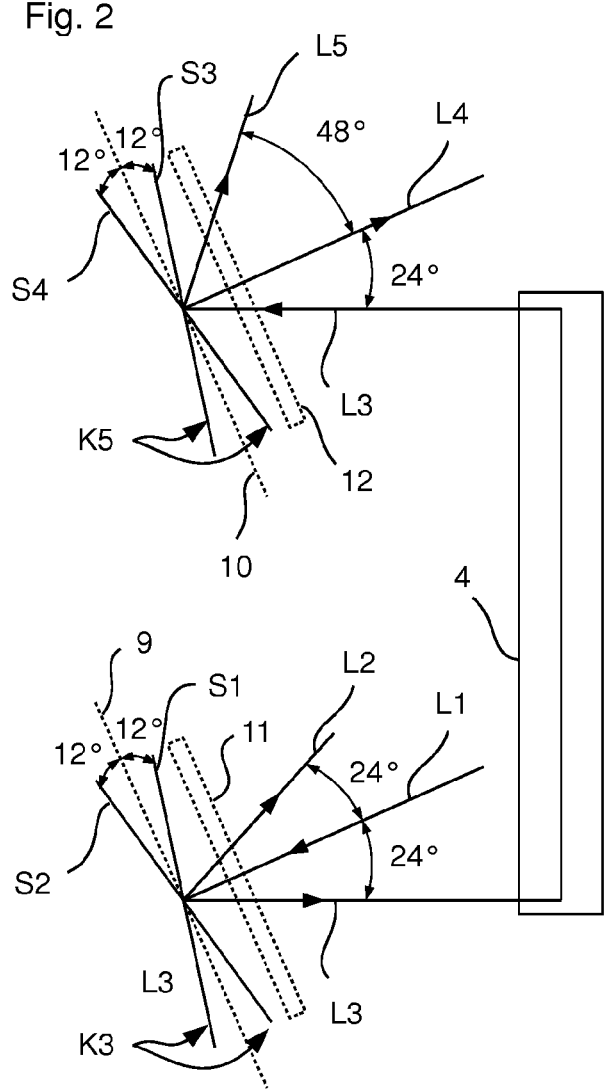
FIG. 2 is a schematic representation explaining the light modulation with the two tilting mirror matrices 3, 5 of the projection device 1 from FIG. 1.

In FIG. 2, to represent each tilting mirror matrix 3, 5 in each case only one single tilting mirror K3, K5 in its two possible tilting positions is drawn in, wherein a tilting of the tilting mirror matrices 3, 5 by 24° (about the x-axis, which runs perpendicular to the plane of drawing) relative to the imaging lens system 4, as is explained in even more detail in the concrete embodiment examples, is represented schematically.

The tilting angle of the tilting mirrors K3, K5 is ±12° relative to the respective DMD plane 9,10 (plane of the central points of the tilting mirrors K3 or K5 respectively), which is tilted by 24°. Furthermore, in the schematic representation of FIG. 2 a cover glass 11, 12 is also drawn in as a dotted line in each case. These cover glasses 11,12 are essential in tilting mirror matrices in order to maintain the vacuum in which the tilting mirrors K3, K5 are found. The cover glasses 11 and 12 thus have to withstand the pressure difference between normal pressure and vacuum and therefore, as a rule, have a thickness of several millimetres. In the embodiments described here, a thickness of 3 mm is assumed, wherein BK7 is used as the type of glass.

The tilting mirrors K3 and K5 are shown in FIG. 2 in a sectional representation which is chosen such that the respective tilting axis of the two tilting mirrors K3 and K5 runs perpendicular to the plane of drawing. Furthermore, the two DMD planes 9, 10 lie in a common plane, which is not represented in FIG. 2 for better presentability.

The tilting mirror K3 of the illumination modulator 3 can be either in its first tilting position S1 or in its second tilting position S2. Both tilting positions are inclined by 12° relative to the DMD plane 9. In FIG. 2, both tilting positions S1 and S2 are drawn in. Of course, the tilting mirror K3 can only ever be in one of the two tilting positions S1 and S2 at one time. The same is true for the tilting mirror K5 of the image modulator 5. The tilting mirror K5 can be either in its first position S3 or in its second position S4.

During operation of the projector 1, the tilting mirror K3 is struck by light L1 from the light source 2 such that the light hits the tilting mirror K3 perpendicular to the DMD plane 9. When the tilting mirror K3 is in its second position S2, as the tilting mirror K3 is tilted by 12° anti-clockwise relative to the plane 9, the light is reflected as a so-called off-light L2 at an angle of 24° to the direction of incidence of the light L1 onto a beam trap, not shown. This off-light L2 is not used to illuminate the image modulator 5.

However, when the tilting mirror K3 is in its first position S1, the light is reflected as a so-called on-light L3 at an angle of 24° relative to the direction of incidence of the light L1. As described in still more detail below, this on-light L3 is imaged by means of the imaging lens system 4 onto the allocated tilting mirror K5 of the image modulator 5. The direction of incidence of the on-light L3 onto the tilting mirror K5 is chosen such that, when the tilting mirror K5 is in its first position S3, the reflected light L4 runs perpendicular to the DMD plane 10. For this, the light L3 incident on the tilting mirror K5 is at an angle of 24° to the perpendicular on the DMD plane 10. In the first tilting position S3 of the tilting mirror K5, this leads to the desired reflection, with the result that the light L4 can be projected by means of the projection lens system 6 onto the projection surface 8.

When the second tilting mirror K5 is in its second position S4, the light is reflected as an off-light L5 at an angle of 48° relative to the perpendicular on the DMD plane 10. This off-light L5 is conducted into a beam trap (not shown) and is not used in the image projection onto the projection surface 8.

In this way, by means of the tilting mirror matrix 3, the 2-dimensionally modulated light source can be provided in which all tilting mirrors K3 of the illumination modulator 3 which are imaged onto a tilting mirror K5, which is to represent an image point that is not black, of the image modulator 5 are brought into the first tilting position. By means of the image modulator 5, the illuminated tilting mirrors K5 can then be switched into the first and second tilting position such that, during a time T of a single frame representation, the desired brightness of the corresponding image point is produced. The brightness can be set by the relationship of the time periods during which the tilting mirror K5 is in its first position and during which the tilting mirror K5 is in its second position. The two modulators 3, 5 can be controlled by pulse-width modulated control data which the control unit 7 generates on the basis of the fed-in control data BD.

For a high-contrast image projection, it is important that the imaging lens system 4 is efficient and has minimal image errors such as distortion or chromatic aberrations. As the cover glasses 11, 12 are obliquely passed through by the on-light L3 in each case, there is a lateral deviation during the imaging of the tilting mirror K3 onto the tilting mirror K5. Even a relatively small lateral deviation, which is typically up to 30 μm and varies for different field points, leads to poorer projection properties in a typical extension of the tilting mirrors K3 and K5 of less than 15 μm.

Figure 3:
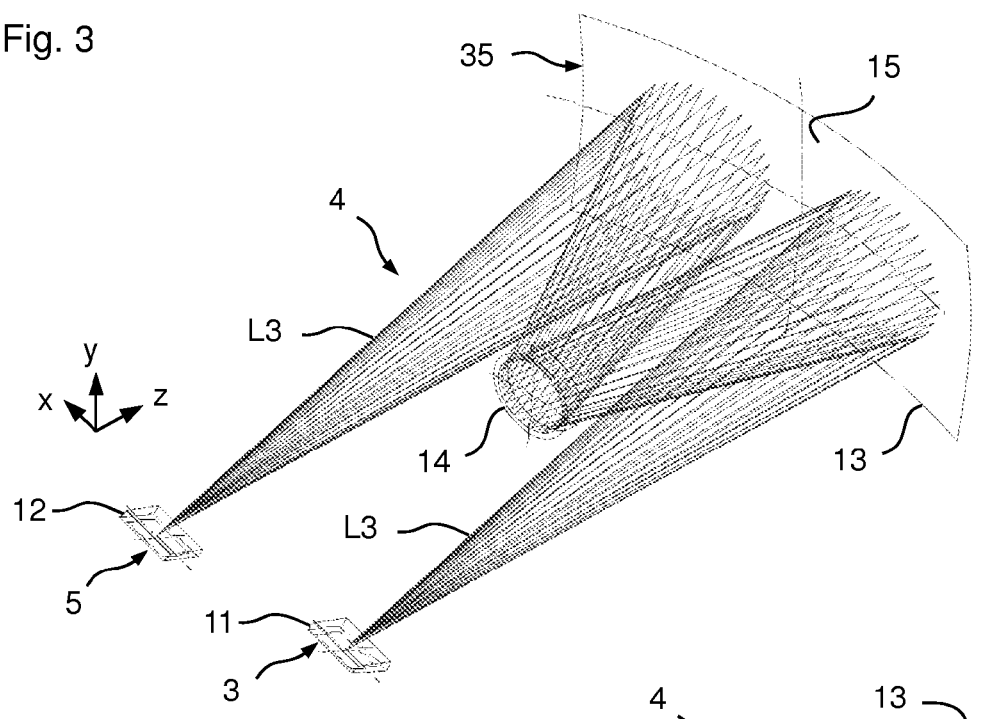
FIG. 3 is a perspective view of the imaging lens system 4 of the projection device 1 from FIG. 1.
Figure 4:
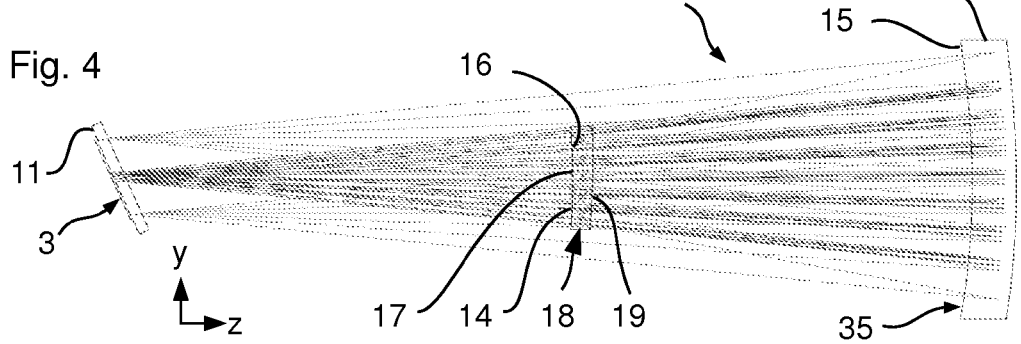
FIG. 4 is a side view of the imaging lens system 4 according to FIG. 3.
Figure 5:
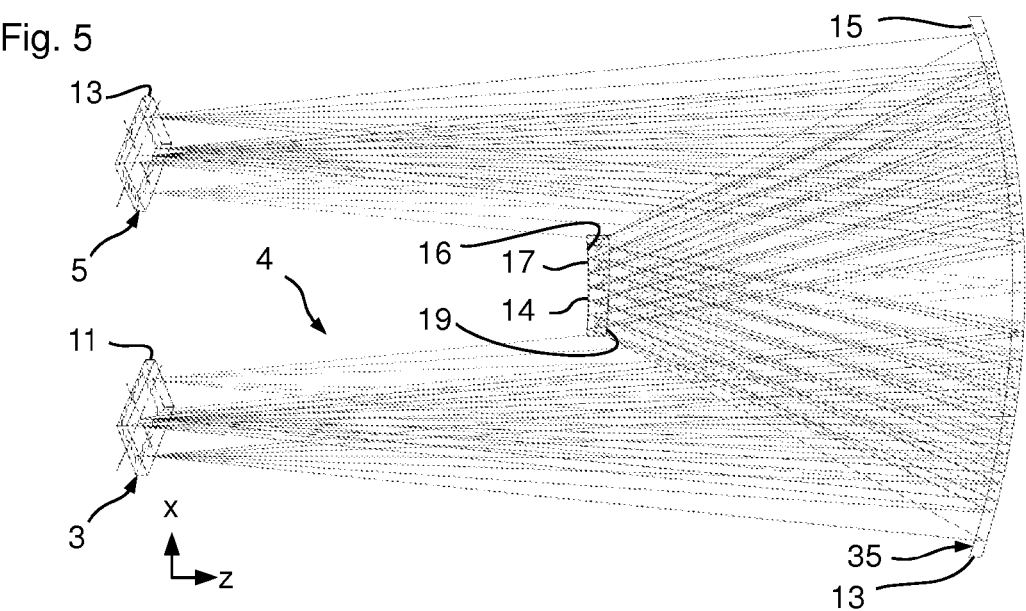
FIG. 5 is a top view of the imaging lens system 4 according to FIG. 3.

In order to reduce these poorer projection properties or the lateral deviation, which causes them, of the image points of the second tilting mirror matrix 5, in the embodiment according to FIGS. 3 to 5 the imaging lens system 4 has a monocentric optics unit 35, with a primary mirror 13 and a secondary mirror 15, as well as a refractive correction element 18. The monocentric optics unit 35, in which all (refractive and/or reflective) active surfaces are arranged concentrically around a common centre of curvature, is here formed as a so-called Offner system and, like all monocentric optical systems, generally has the property of imaging a small area of the volume around the common centre of curvature into itself (inverted) by means of an almost error-free intermediate imaging. It is thereby possible to use such monocentric systems also as relay lens systems for object and image fields obliquely arranged to the beam path and parallel to one another.

As, in the case of tilting mirror matrices customary in the trade, the tilting axes about which the individual tilting mirrors tilt are rotated relative to the outside edges of the rectangular overall matrix (namely typically by 45°), the tilting mirror matrices 3 and 5 are arranged correspondingly rotated, as can be seen from FIGS. 3 and 5 in particular, in order that the tilting axes run in the x-direction. Furthermore, the already described tilting of the DMD planes by 24° about the x-axis is present.

The mirror surface 15 of the primary mirror 13 is a concave spherical surface and the mirror surface 16 of the secondary mirror 14 is a convex spherical surface, wherein the two centres of curvature of the two mirror surfaces 15 and 16 coincide. The correction element 18 provided for correcting the aberrations caused by the cover glasses 11 and 12 is here formed as a lens 18, wherein the secondary mirror 14 is arranged on the back 17 of the lens 18. The front 19 of the lens 18 facing the primary mirror 13 is formed as a free-form surface, the curvature of which runs differently in two sections running perpendicular to one another and changes depending on the position on the front 19.

The curvature of the front 19 can be described for example by a polynomial development according to the following Formula 1:

$$z = \frac{(x^2 + y^2)/R}{1 + \sqrt{1 - (1+k) \cdot \frac{(x^2 + y^2)}{R^2}}} + \sum_{i,j} C_{ij} x^i y^j \quad (1)$$

The free-form surface of the front 19 is here formed mirror-symmetrical in respect of the yz-plane, with the result that the development coefficients $C_{ij}$ of the above Formula 1 have a value different from zero if the coefficient $C_{ij}$ describes an even power of x.

The development coefficients $C_{ij}$ for the front 19 of the lens 18 are given in the following table, wherein XiYj is chosen as designation. If i=0, Xi is not given. The same is true for j=0. In this case, Yj is not given. Furthermore, for j=1 only Y is given. Thus, for example X2Y designates the development coefficient $C_{21}$, Y4 the development coefficient $C_{04}$ and X4Y the development coefficient $C_{41}$.

| Y: −3.9260E−03 | X2: 8.4604E−03 | Y2: 8.4484E−03 |
|---|---|---|
| X2Y: −2.9354E−07 | Y3: −3.0556E−07 | X4: 1.7613E−06 |
| X2Y2: 3.5208E−06 | Y4: 1.7616E−06 | X4Y: −4.0056E−11 |
| X2Y3: −5.8332E−11 | Y5: −3.9814E−11 | X6: 6.0814E−10 |
| X4Y2: 1.8397E−09 | X2Y4: 1.8379E−09 | Y6: 6.0026E−10 |

The mirror lens 18 here has a thickness of 6 mm and BK7 is used as material. Furthermore, a numerical aperture of 0.1 is assumed for the illumination of the tilting mirrors K3 and K5 for the present embodiment and for all subsequent embodiments.

Because of the different curvature progressions of the refractive front 19 (or refractive free-form surface) in the two orthogonal principal sections, at the same time an excellent correction of the transverse chromatic aberration, axial astigmatism and axial coma is achieved.

As the secondary mirror 15 is formed as a mirror lens 18, the front 19 to be processed is small, with the result that production costs and weight can be minimized. Furthermore, the desired alignment between the refractive surface (front 19) and the mirror surface 16 of the secondary mirror 14 is present.

Figures 6, 7:
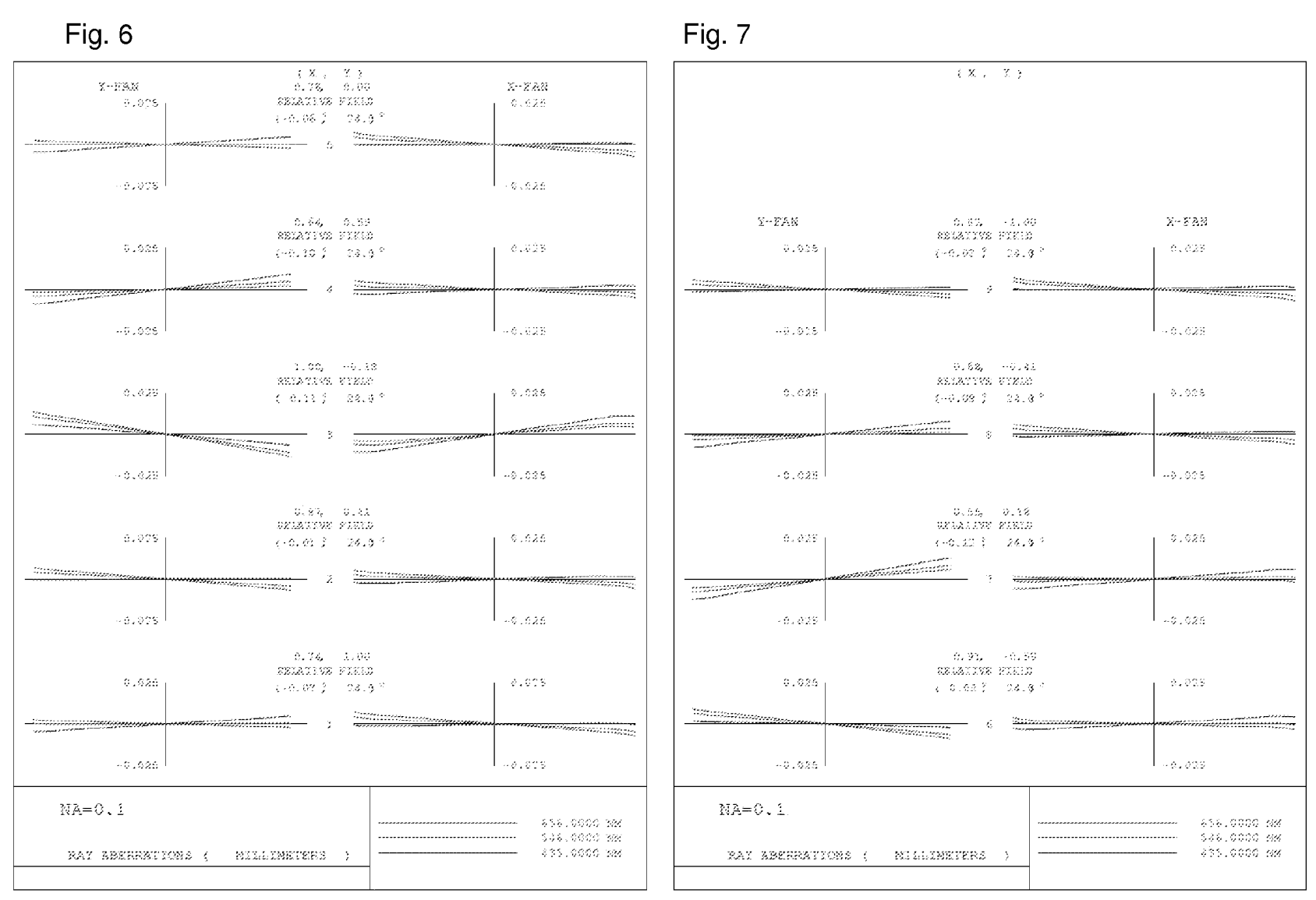

In FIGS. 6 and 7, image error representations of the projection device 1 according to FIGS. 3 to 5 are shown, wherein in each case two columns are represented. The left-hand column relates to the principal section in the yz-plane and the right-hand column relates to the principal section perpendicular thereto in the xz-plane, wherein the image errors are represented in mm in each case for the wavelengths 435, 546 and 656 nm. In each case the relative x- and y-coordinates are given next to each other between the corresponding image error curves for the two principal sections. Beneath that, the main beam angles in the image space are listed. Thus, for example, in the top representation in FIG. 6 the x- and y-coordinates are 0.78 and 0.00. The main beam angle is −0.06° or 24.0° respectively.

Figure 8:
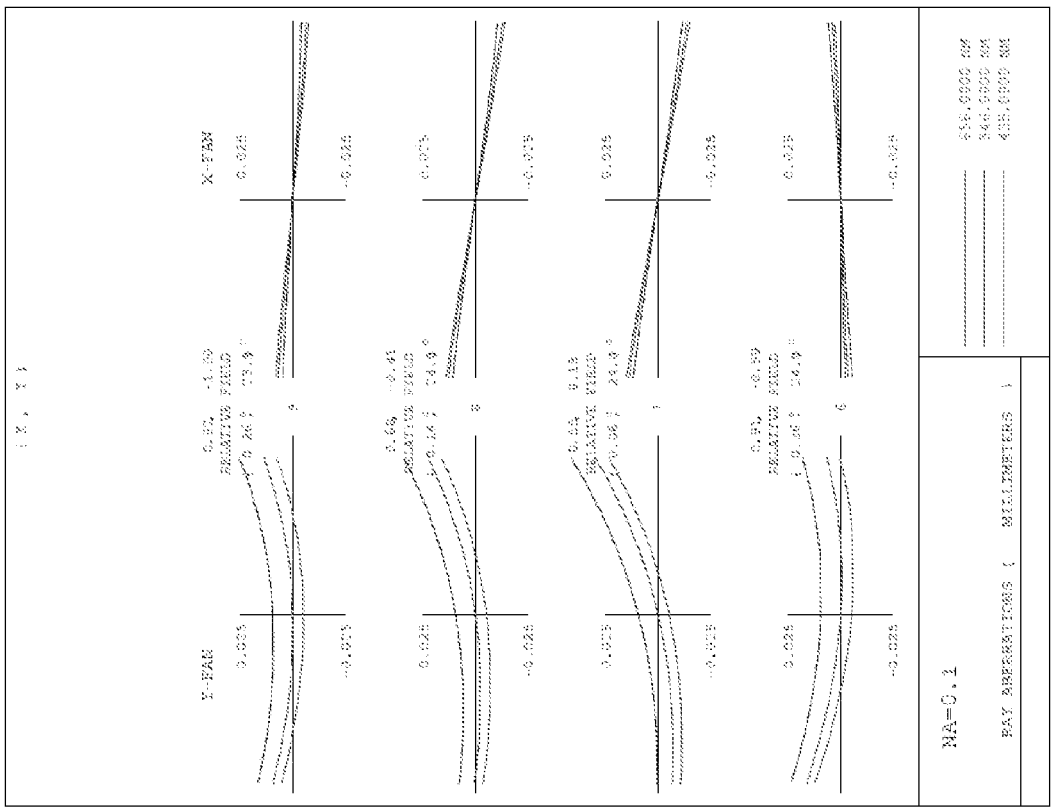
FIGS. 8 and 9 are representations of image errors of a projection device without refractive correction element 18.
Figure 9:
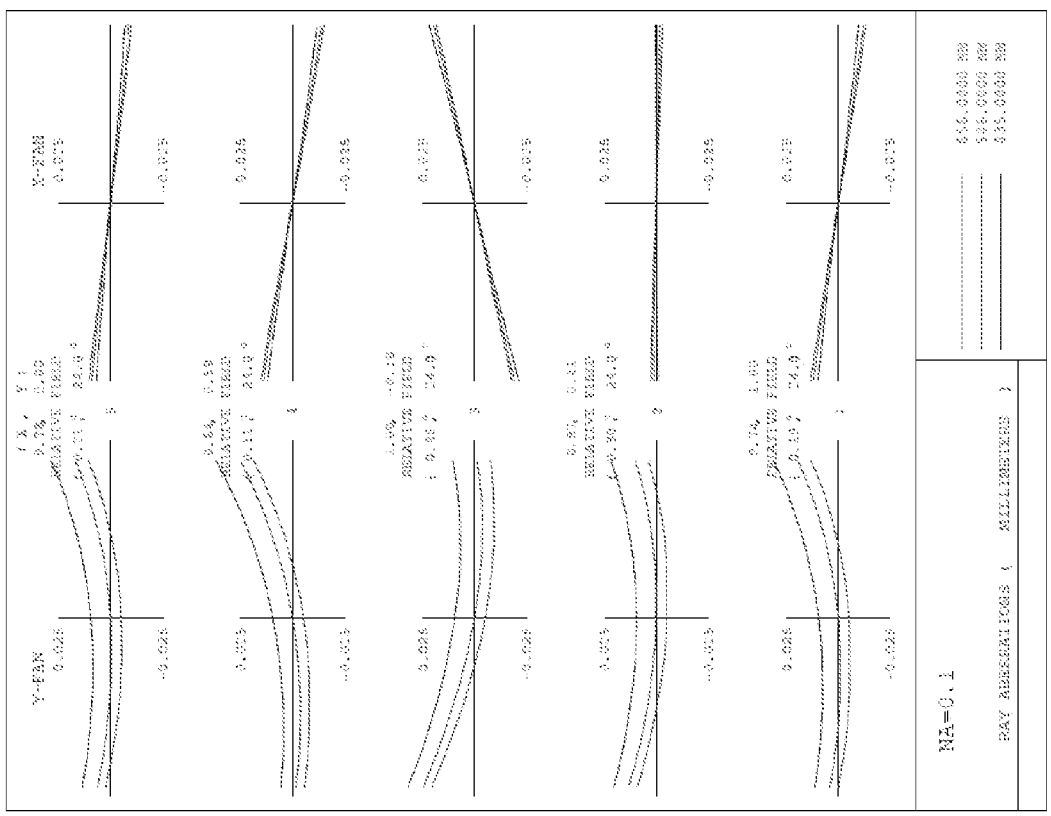

FIGS. 8 and 9 show, for comparison in the same way as in FIGS. 6 and 7, image errors of an imaging lens system which, although formed as an Offner system according to FIGS. 3 to 5, does not contain a correction element.

As the comparison of the image errors represented in FIGS. 8 and 9 with those according to the design according to the invention of the projection device in FIGS. 6 and 7 shows, there is an excellent correction of the transverse chromatic aberration, astigmatism and axial coma in the two principal sections. On the one hand, in the conventional solution according to FIGS. 8 and 9 there is a lateral deviation of the image points on the second tilting mirror matrix 5 of up to 30 µm, which prevents a pixel-accurate allocation of the tilting mirrors K3 and K5 to the two tilting mirror matrices 3, 5 in the case of a typical tilting mirror size of less than 15 µm. On the other hand, in the projection device 1 according to the invention the lateral deviation of the image points on the second tilting mirror matrix from the ideal actual position is much smaller, with the result that better imaging properties are provided.

Figure 10:
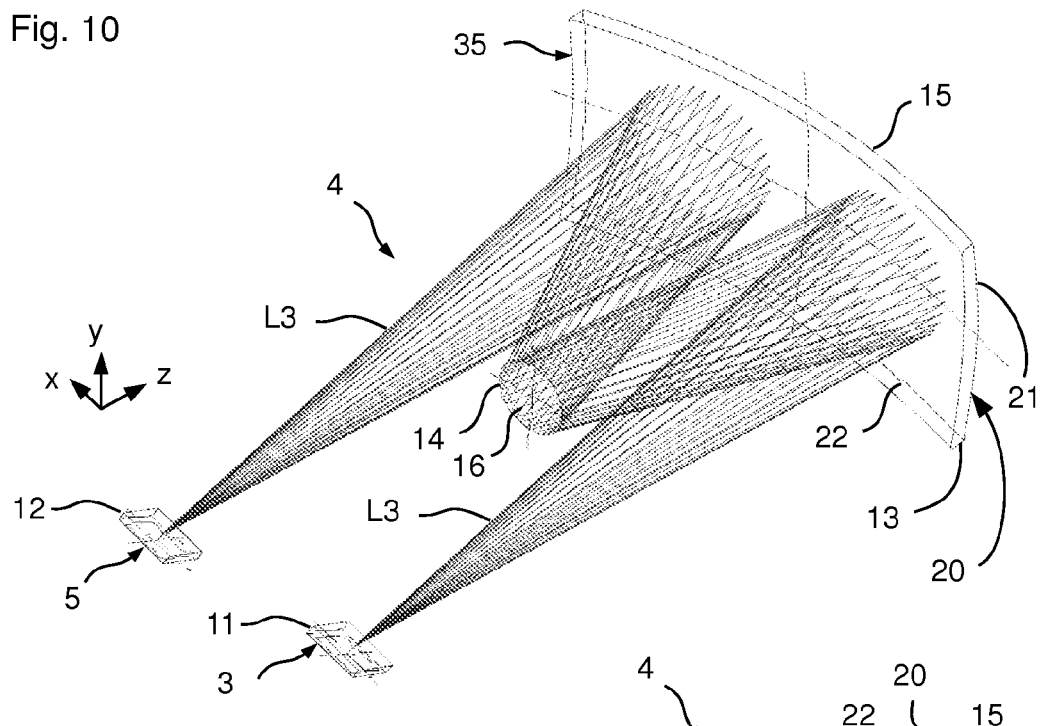
FIG. 10 is a perspective view of a further embodiment of the imaging lens system 4 of the projection device from FIG. 1.
Figure 11:
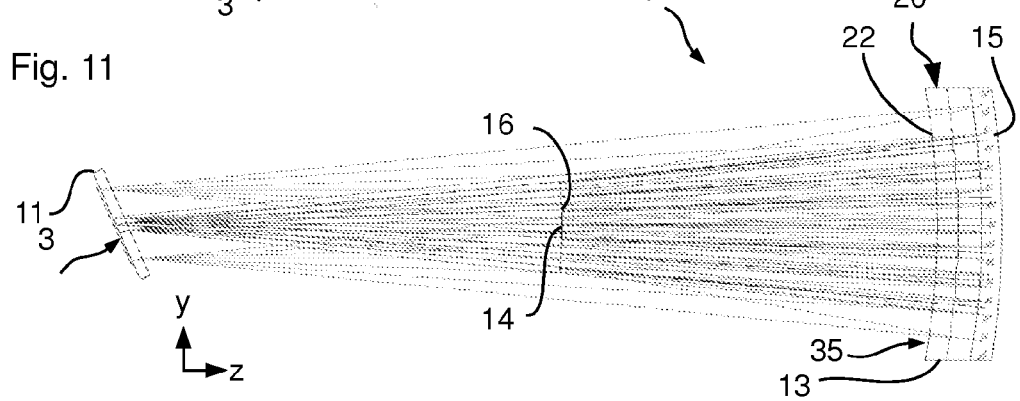
FIG. 11 is a side view of the imaging lens system 4 according to FIG. 10.
Figure 12:
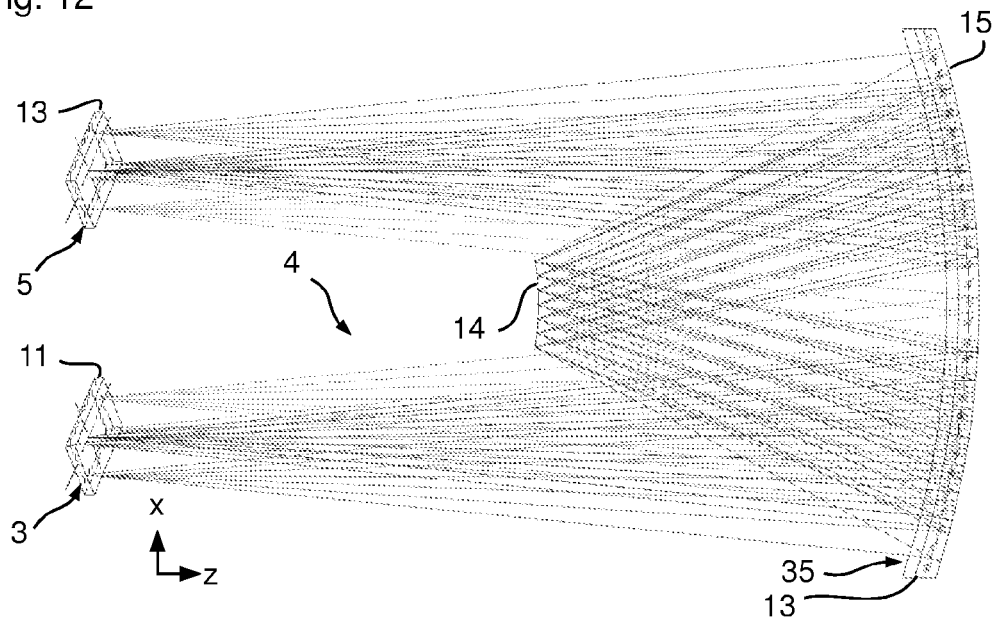
FIG. 12 is a top view of the imaging lens system 4 according to FIG. 10.

In FIGS. 10 to 12, in the same way as in FIGS. 3 to 5, the imaging lens system 4 of a second embodiment of the projection device 1 according to the invention is shown, wherein in turn an Offner system is assumed as monocentric optics unit 35. In the imaging lens system 4 according to FIGS. 10 to 12, in contrast to the embodiment according to FIGS. 3 to 5, the secondary mirror 14 is not now formed as a mirror lens and correction element, but the primary mirror 13 is and can thus be designated as mirror lens 20. The back 21 of the mirror lens 20 is spherically curved and metallized, and forms the mirror surface 15. The front 22 of the mirror lens 20 facing the secondary mirror 14 is in turn formed as a free-form surface according to the invention, the curvature of which runs differently in two sections running perpendicular to one another and changes depending on the position on the surface. The mirror lens can have a thickness of 6 mm and for example NFK5 can be used as material. The free-form surface or front 22 can be described by a polynomial development according to Formula 1, wherein the development coefficients $C_{ij}$ are given in the following Table 2 in the same way as in Table 1.

| Y: 1.2255E−03 | X2: −9.9112E−05 | Y2: −9.6702E−05 |
|---|---|---|
| X2Y: 2.7816E−08 | Y3: 2.6980E−08 | X4: −1.1159E−09 |
| X2Y2: −2.3669E−09 | Y4: −1.1140E−09 | |

Figure 14:
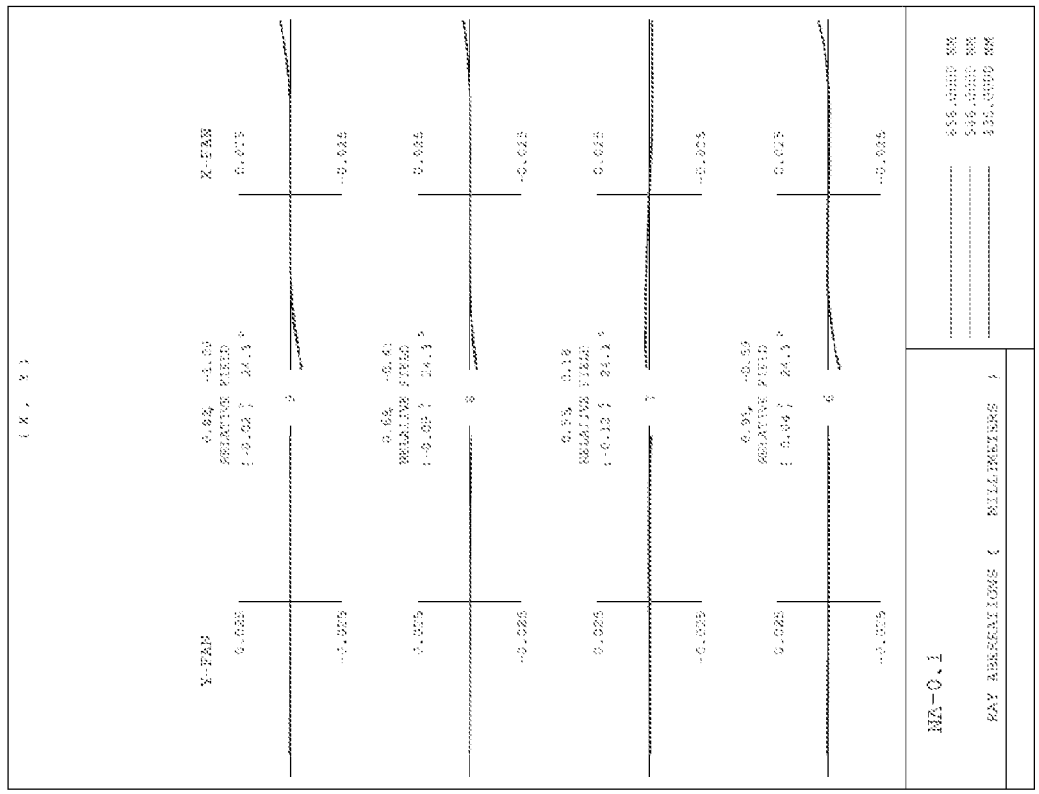
FIGS. 13 and 14 are representations of image errors for the projection device according to FIGS. 10 to 12 in the same way as in FIGS. 6 and 7.
Figure 13:
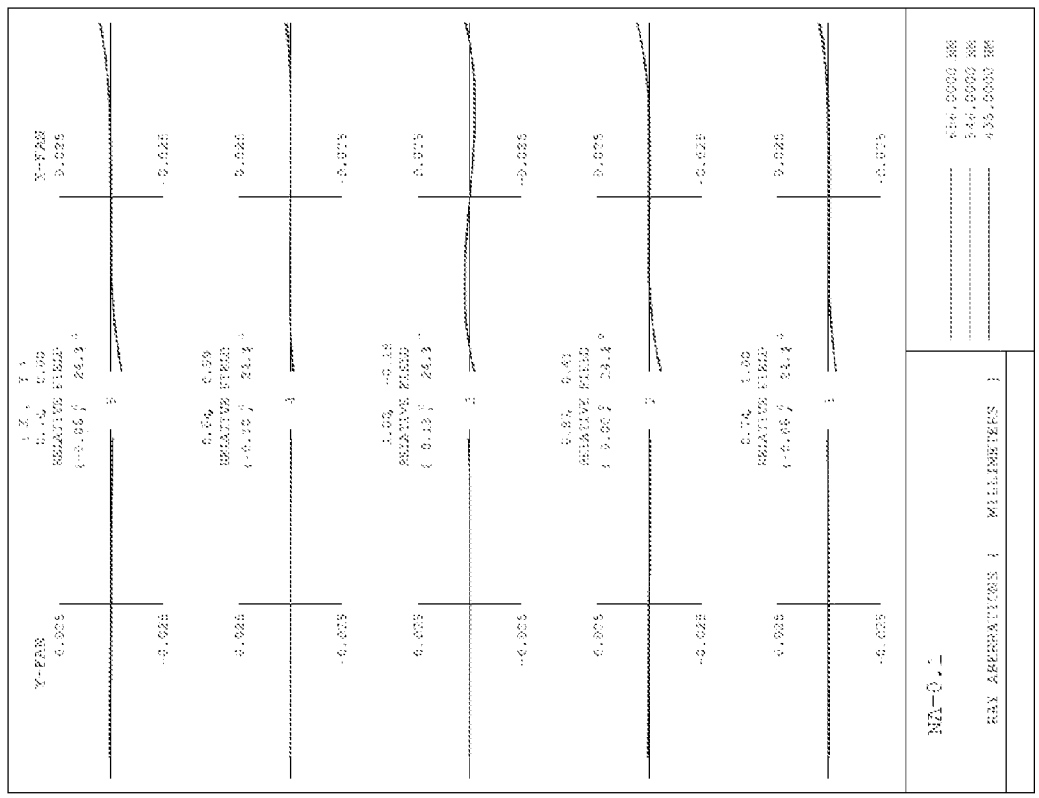

In this design, all chromatic and monochromatic image errors can be excellently corrected at the same time, as can be seen from the image error representations in FIGS. 13 and 14. This is even possible with a low polynomial order of the free-form surface 22, in comparison with the embodiment according to FIGS. 3 to 5. The free-form surface 22 lies in the intermediate area between near-to-field and near-to-aperture and is therefore particularly suitable to guarantee an excellent correction of all image errors occurring. The imaging of the imaging lens system 4 is practically diffraction-limited and has only extremely low distortions of the image points in the two coordinate directions.

Figure 15:
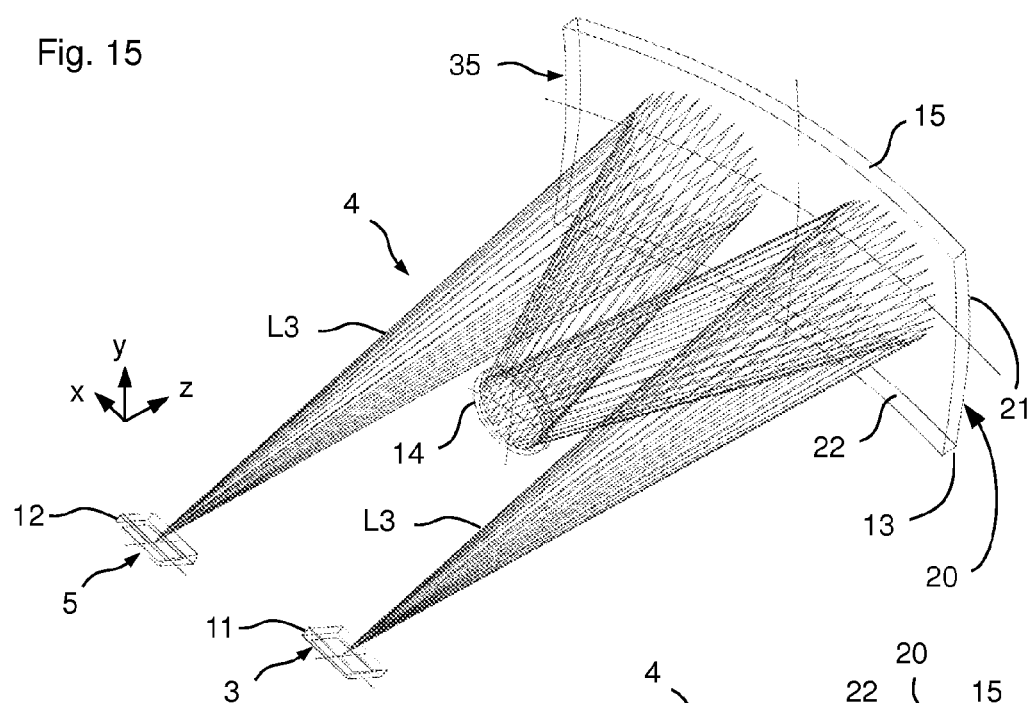
FIG. 15 is a perspective view of a further embodiment of the imaging lens system 4 of the projection device 1 according to FIG. 1.
Figure 16:
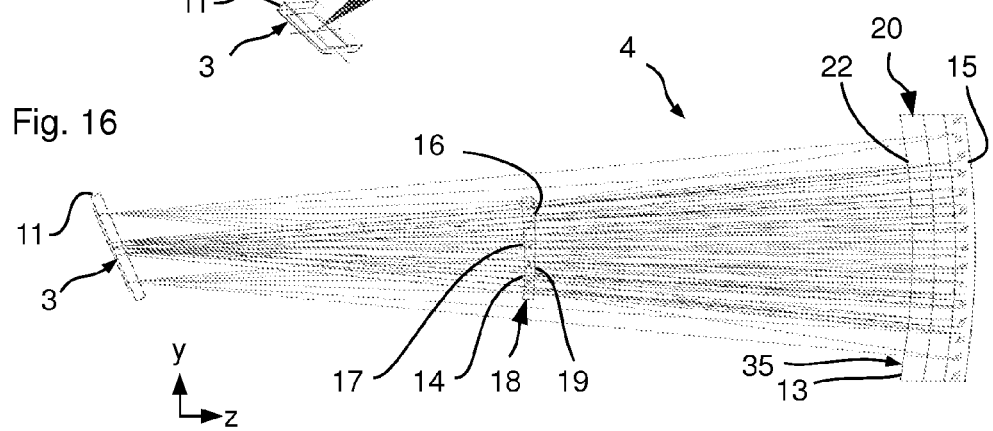
FIG. 16 is a side view of the imaging lens system 4 from FIG. 15.
Figure 17:
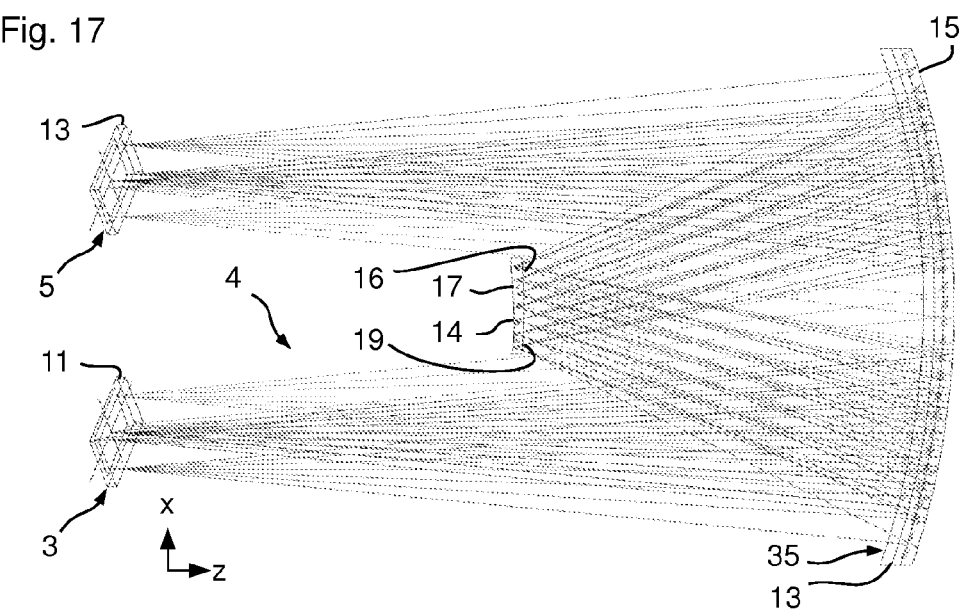
FIG. 17 is a top view of the imaging lens system 4 from FIG. 15.
Figure 19:
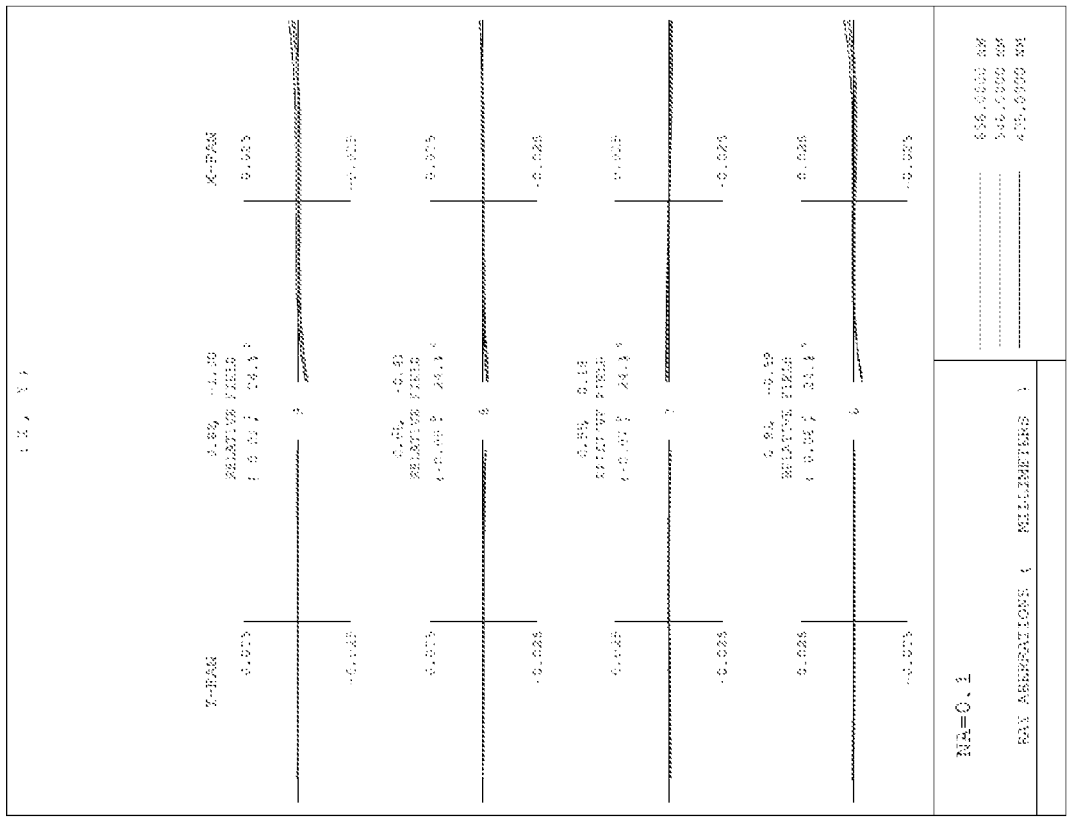
FIGS. 18 and 19 are representations of image errors for the projection device according to FIGS. 15-17 in the same way as in FIGS. 6 and 7.
Figure 18:
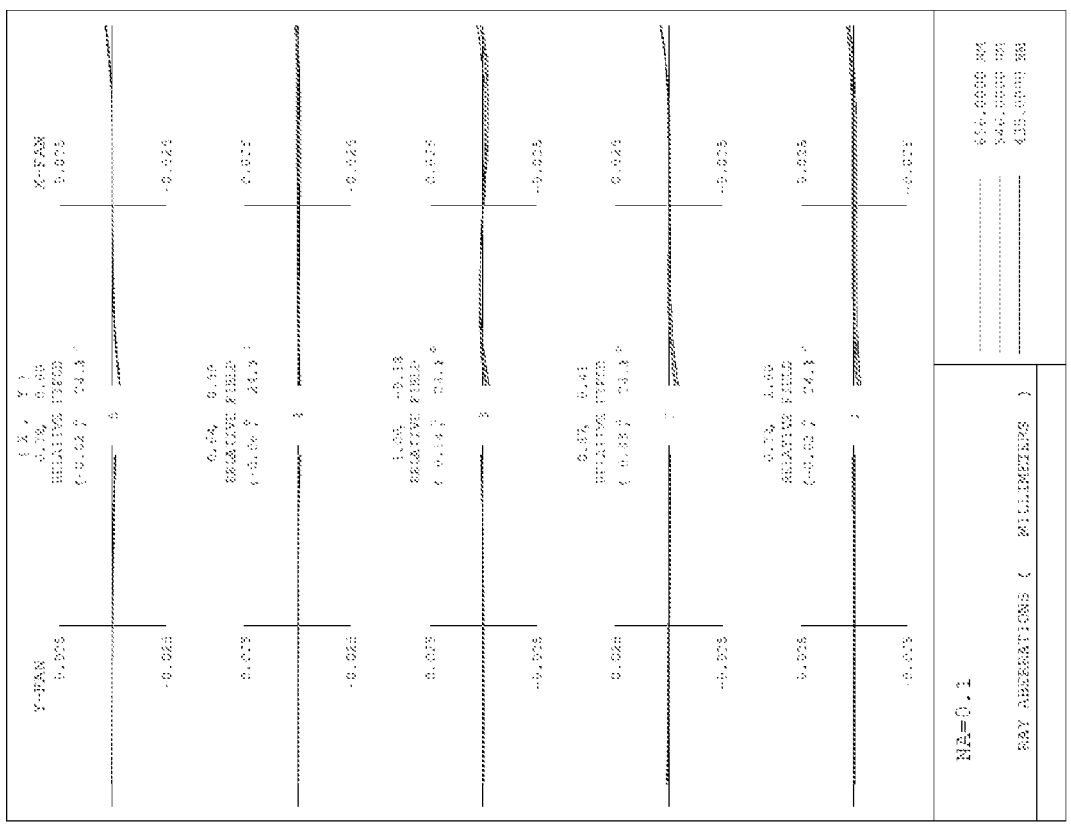

In FIGS. 15 to 17 the imaging lens system 4 of a further embodiment of the projection device 1 according to the invention is shown. In this embodiment both the primary mirror 13 and the secondary mirror 14 are formed in each case as mirror lenses 18, 20, wherein the fronts of the lenses 18, 20 facing each other are in each case formed as a free-form surface and the backs 17 and 21 of the two lenses 18 and 20 are in each case metallized to form spherical primary mirror 13 and spherical secondary mirror 14. Two refractive correction elements are thus provided. The two mirrors 13 and 14 form the monocentric optics unit. For example NFK5 can be used as material of the mirror lenses 18, 20, wherein the mirror lens 18 has a thickness of 3 mm and the mirror lens 20 has a thickness of 6 mm. With this embodiment, an improvement in the correction of the imaging lens system 4 compared with the variant according to FIGS. 10 to 12 can be achieved, as can be seen e.g. from the image error representations in FIGS. 18 and 19.

Figure 20:
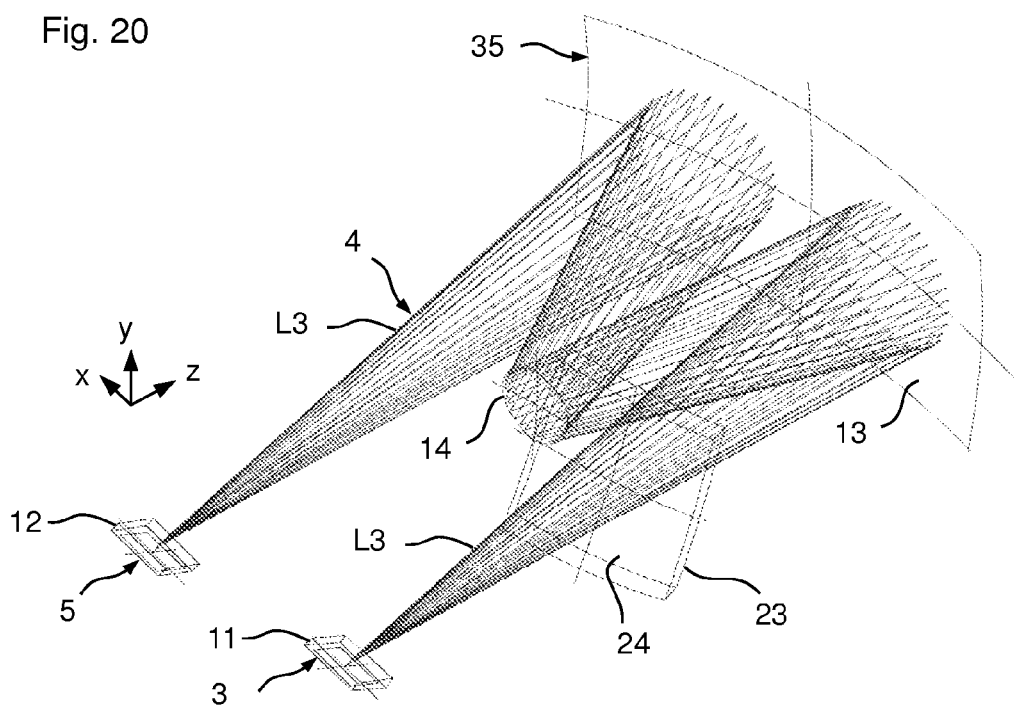
FIG. 20 is a perspective view of a further embodiment of the imaging lens system 4 of the projection device 1 according to FIG. 1.
Figure 21:
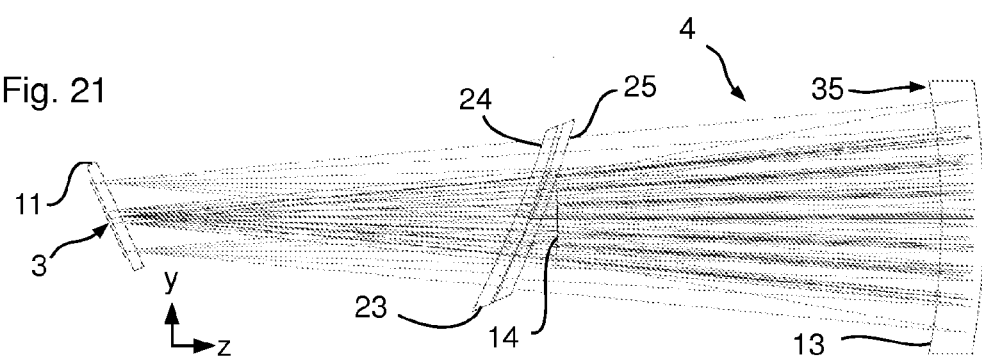
FIG. 21 is a side view of the imaging lens system 4 from FIG. 20.
Figure 22:
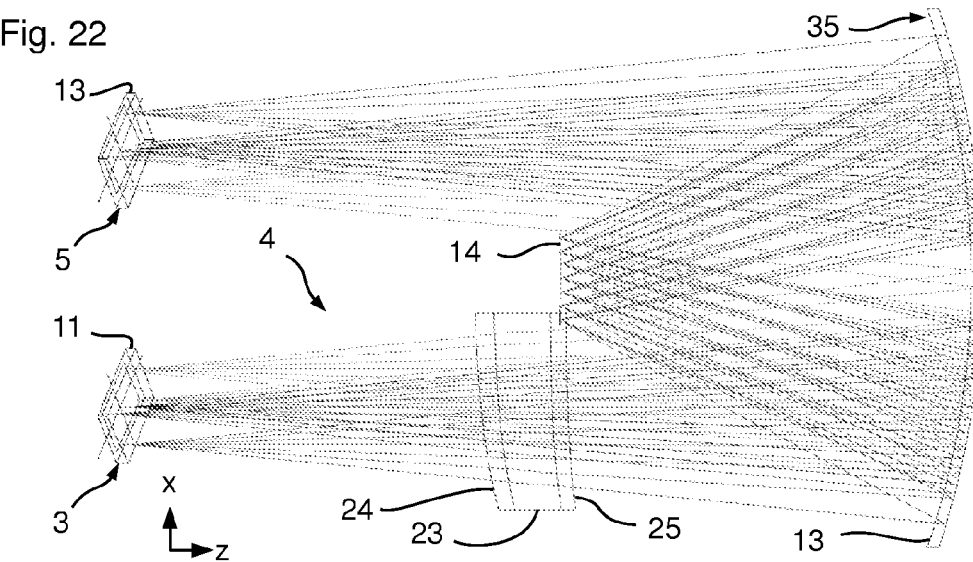
FIG. 22 is a top view of the imaging lens system 4 from FIG. 20.

In FIGS. 20 to 22 a further design of the imaging lens system 4 according to a further embodiment of the projection device 1 according to the invention is shown. In this design, the two mirrors 13 and 14 form an Offner system (they are in each case spherically curved and their centres of curvature coincide). In the beam path from the illumination modulator 3 to the primary mirror 13 a refractive correction element 23 is arranged which has a front 24 facing the illumination modulator 3 and a back 25 facing away from the illumination modulator 3. The thickness of the correction element 23 is 5 mm and NFK5 was used as material. Both the front 24 and the back 25 are formed as a free-form surface, the curvature of which runs differently in two sections running perpendicular to one another and changes depending on the position on the surface.

The free-form surface of the front 24 can in turn be described by a polynomial development according to Formula 1. The corresponding coefficients are given in the following Table 3.

| Y: −4.6015E−01 | X2: −1.9111E−04 | Y2: −1.2464E−02 |
| X2Y: 1.7592E−06 | Y3: 1.6356E−04 | X4: 1.0384E−07 |
| X2Y2: 1.8553E−07 | Y4: −1.1638E−06 | |

In the same way, the back 25 can be described by a polynomial development according to Formula 1. The coefficients are given in the following Table 4.

| Y: −4.3142E−01 | X2: −1.7340E−04 | Y2: −1.2929E−02 |
| X2Y: 1.0752E−06 | Y3: 1.6435E−04 | X4: 9.8878E−08 |
| X2Y2: 1.7808E−07 | Y4: −1.1118E−06 | |

The local coordinate origin for the surface description of the front 24 and back 25 originates from the global coordinate origin (intersection point of the optical axis of the Offner system with the straight lines connecting the two modulators 3, 5) only by a shift along the z-axis by 151 mm (front 24) or 156 mm (back 25) respectively. Thus, the development point for the polynomial development of the two free-form surfaces of front and back 24, 25 lies outside the optically used area of the surfaces 24, 25 and on the optical axis of the rotationally symmetrical relay lens system 35 in itself (the monocentric optics unit 35 formed by the two mirrors 13 and 14).

Figure 23:
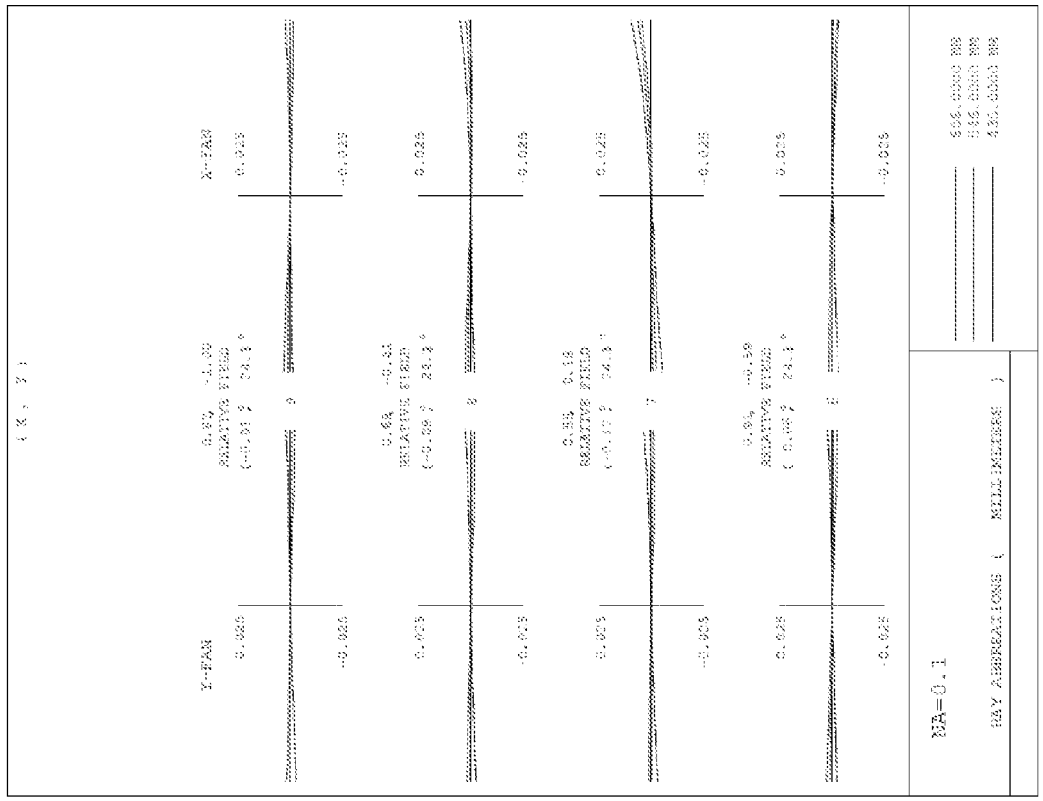
FIGS. 23 and 24 are representations of image errors for the projection device according to FIGS. 20-22 in the same way as in FIGS. 6 and 7.
Figure 24:
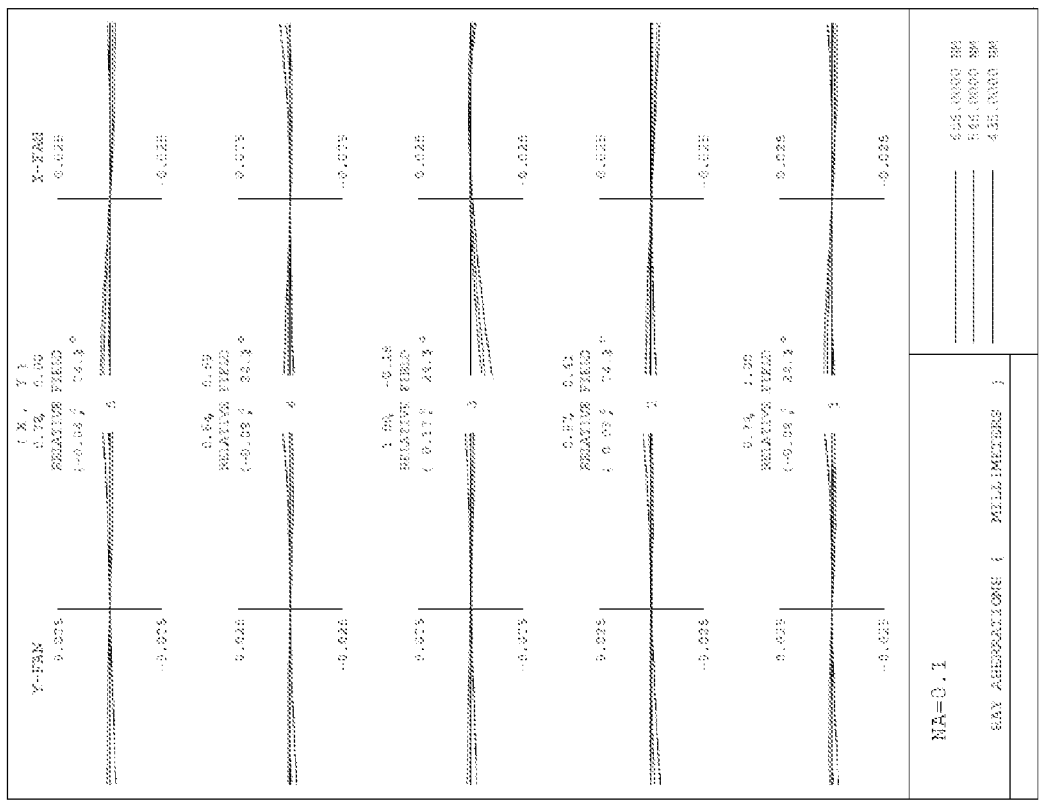

With such a correction element 23, the wavefront errors caused by the cover glasses 11, 12 can be almost completely compensated for, as can be seen from the image error representations in FIGS. 23 and 24. The imaging is pixel-accurate or accurate to the tilting mirror. The distortion, thus the lateral deviation of the image points on the image modulator 5 from their ideal image position, is here smaller than 5 µm for all field points in x- and y-direction.

Figure 25:
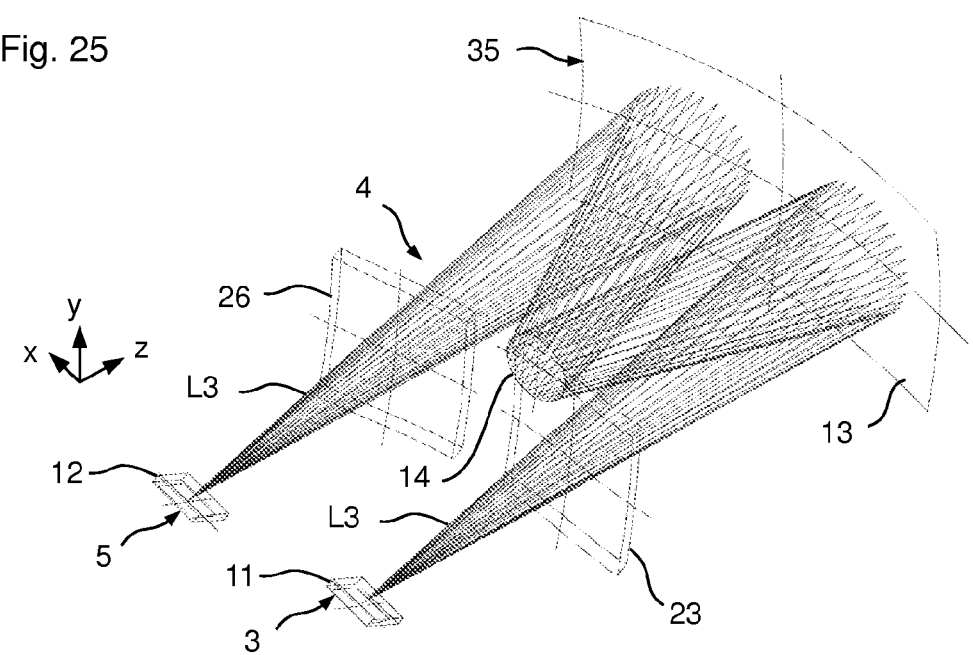
FIG. 25 is a perspective view of a further embodiment of the imaging lens system 4 of the projection device 1 from FIG. 1.
Figure 26:
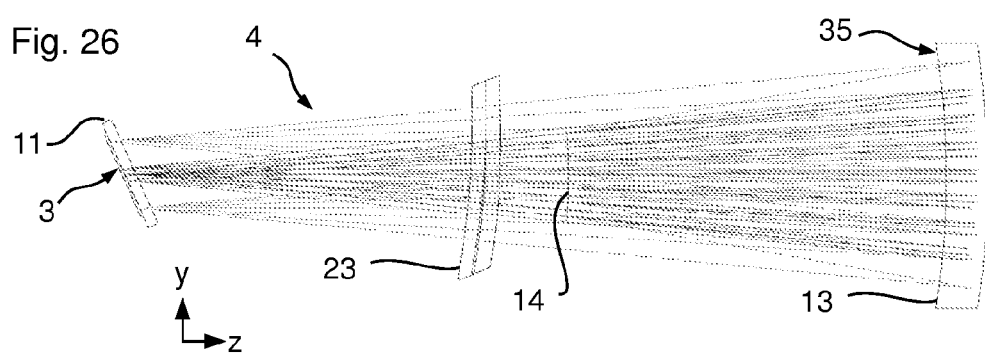
FIG. 26 is a side view of the imaging lens system 4 from FIG. 25.
Figure 27:
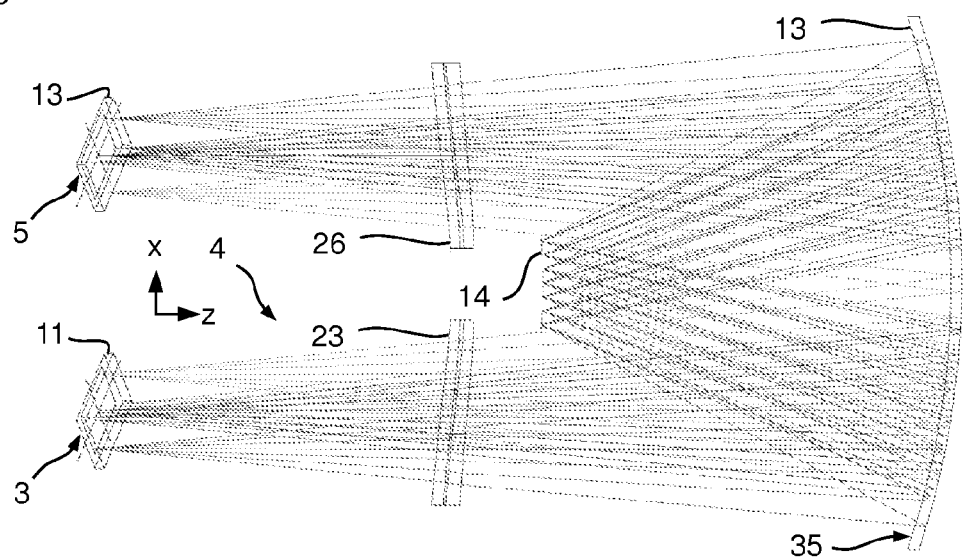
FIG. 27 is a top view of the imaging lens system 4 from FIG. 25.

A further modification of the imaging lens system 4 is represented in FIGS. 25 to 27. In this modification, in addition to the correction element 23, a further correction element 26 is arranged in the beam path between the primary mirror 13 and the image modulator 5. The further correction element 26 can, as shown in the representations according to FIGS. 25 to 27, be formed as a separate element. However, it is also possible for the two correction elements 23 and 26 to be formed as a coherent correction element. The two correction elements 23 and 26 or the correction element 23 formed as a single correction element are preferably symmetrical to the yz-plane. This symmetrical design has the advantage that the requirement for the positional accuracy of the correction element 23 or the correction elements 23 and 26 is a little reduced, and thus the adjustment is simplified. Naturally, the design as a single correction element is advantageous, as the alignment of the two correction elements 23, 26 relative to each other is dispensed with and the positioning of the single correction element relative to the two tilting mirror matrices has less critical alignment tolerances.

Figure 28:
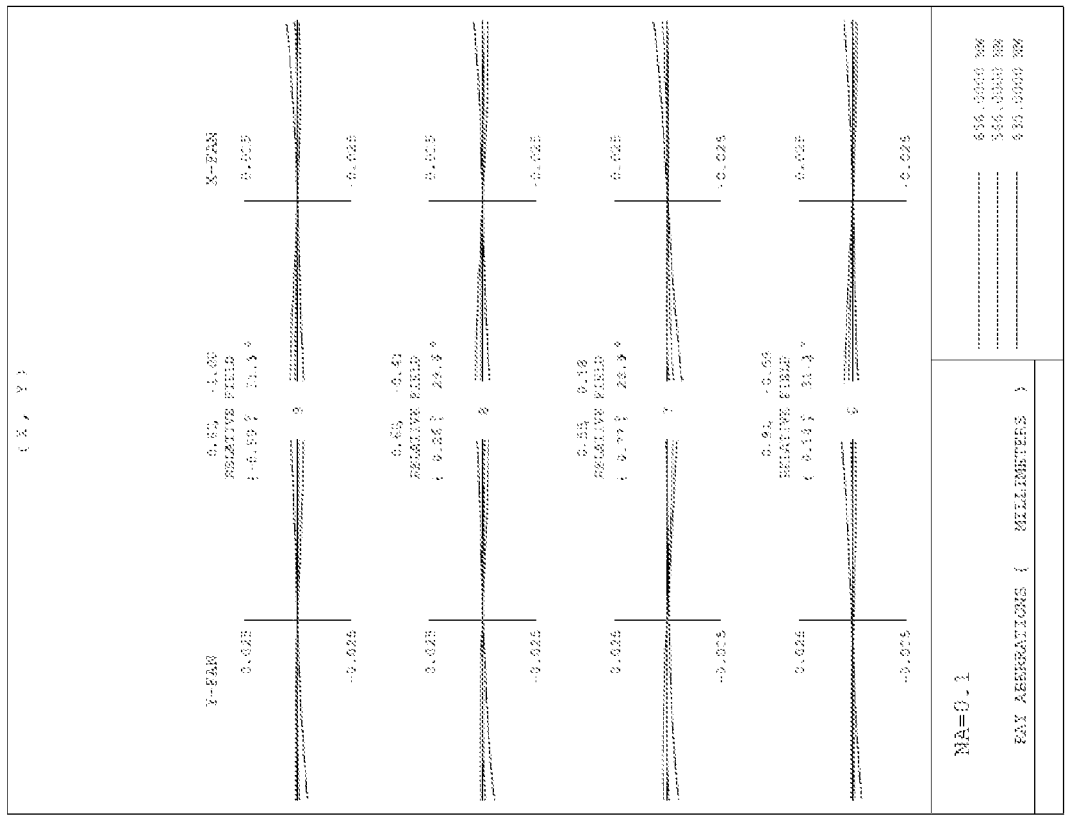
FIGS. 28 and 29 representations of image errors for the projection device according to FIGS. 25-27 in the same way as in FIGS. 6 and 7.
Figure 29:
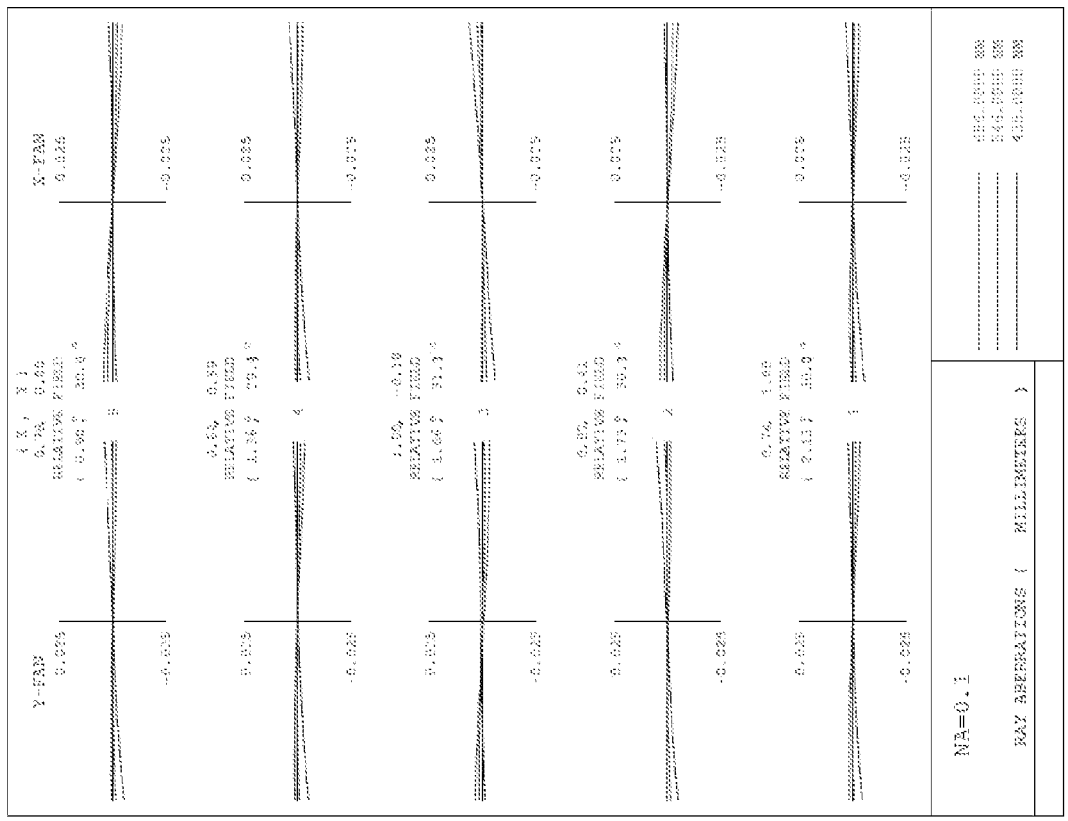

With this design of the imaging lens system 4 a correction of the aberration induced by the cover glasses can be carried out on a practically diffraction-limited level, as can be seen from the image error representations in FIGS. 28 and 29. A pixel-accurate distortion correction is also possible.

Figure 30:
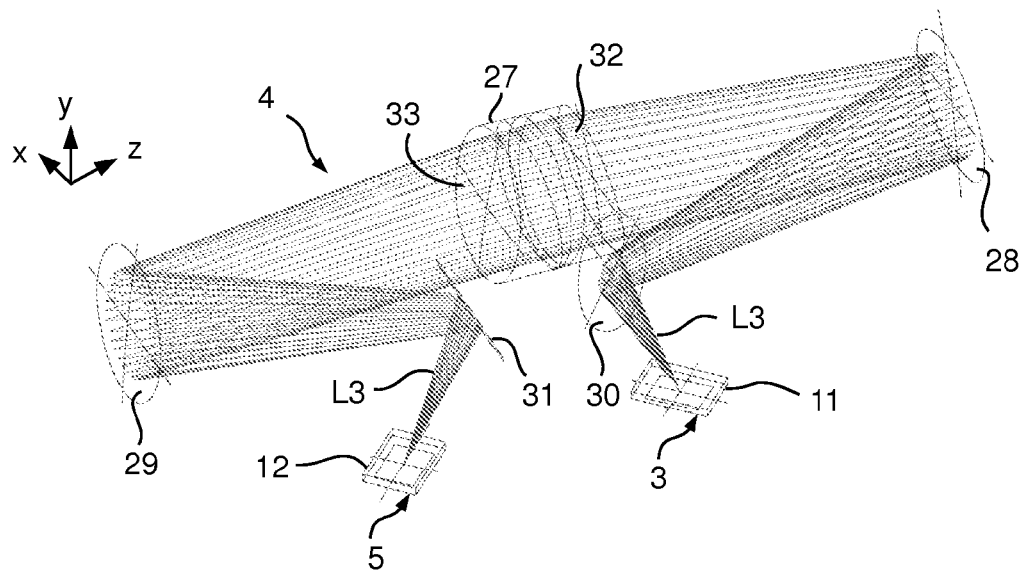
FIG. 30 is a perspective view of a further embodiment of the imaging lens system 4 of the projection device 1 from FIG. 1.
Figure 31:
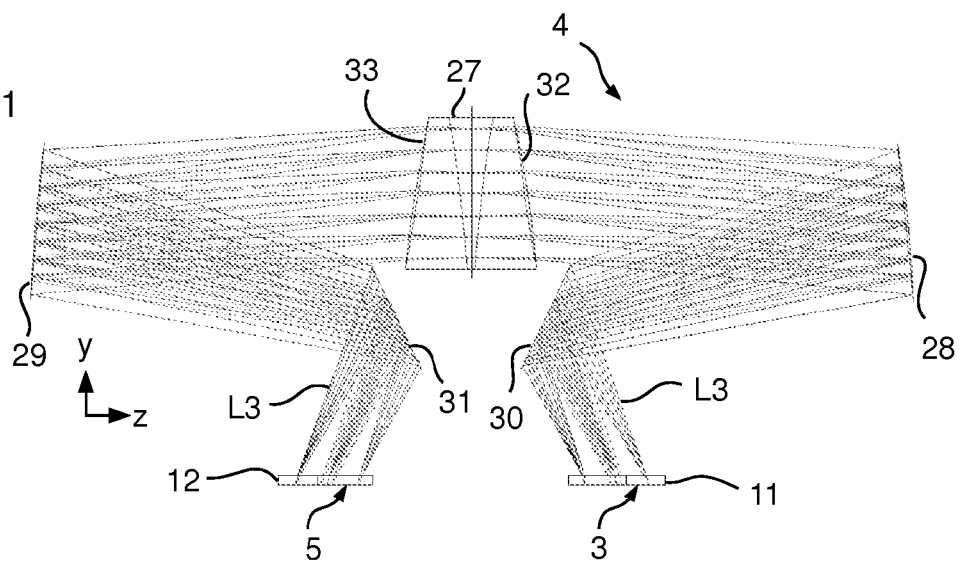
FIG. 31 is a top view of the imaging lens system 4 from FIG. 30.
Figure 32:
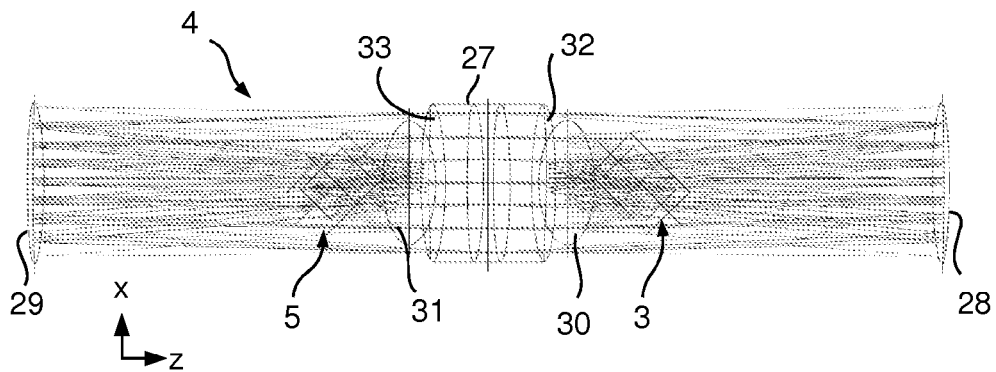
FIG. 32 is a side view of the imaging lens system 4 from FIG. 30.

In FIGS. 30-32 a further design of the imaging lens system 4 is shown which differs from the previous Offner structure. It is possible to imagine that this design is formed by unfolding an Offner system around the secondary mirror, which is dispensed with. Instead of the secondary mirror, there is a wedge-shaped correction element 27 which, together with the free-form mirrors 28 and 29, undertakes the corrections of the imaging. The actual imaging takes place only using the two free-form mirrors 28 and 29 which correspond to the primary mirror in an Offner system. The two planar reflecting mirrors 30 and 31 serve only to make it possible to attach the two modulators 3, 5 in a spatially separated manner. Thus, the curvatures of the two free-form mirrors 28 and 29 are identical. The same is true for the two refractive free-form surfaces 32 and 33 of the correction element 27. In order to reduce chromatic aberrations, the correction element 27 is designed as an achromatic cemented group.

Figure 33:
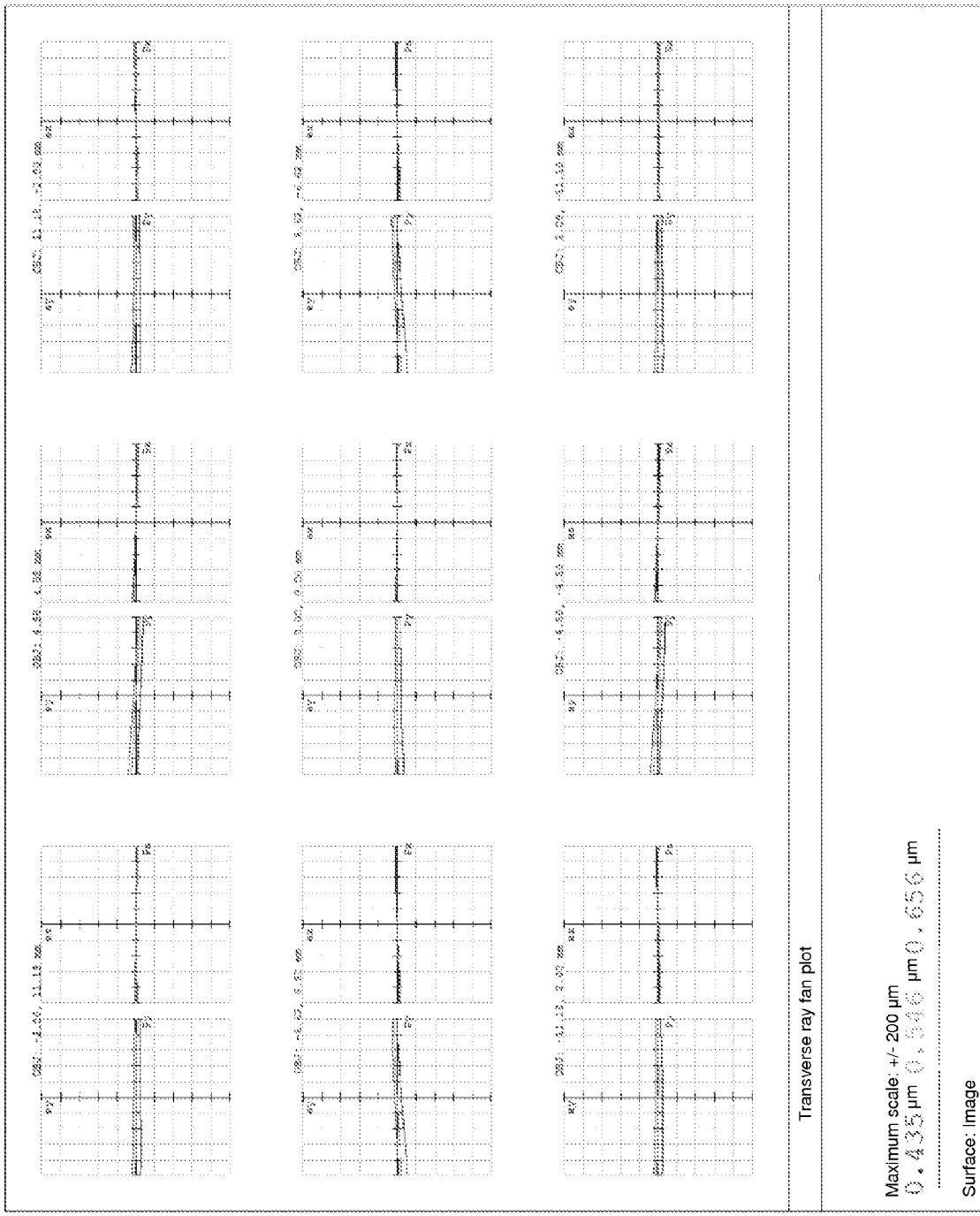
FIG. 33 is a representation of image errors for the projection device according to FIGS. 30-32.

With this structure too, excellent aberration corrections and a pixel-accurate imaging can be produced, as can be seen from the image error representations in FIG. 33.

The described embodiments or features of the described embodiments can also be combined with each other.

In the description thus far, it has been assumed that the illumination modulator 3 is struck by white light. However, it is also possible that the light source 2 emits coloured light. In particular, it can emit time-sequentially differently coloured light, such as e.g. red, green and blue light. A multi-coloured image can then be generated in the manner known to a person skilled in the art through the time-sequential representation of red, green and blue colour partial images. The colour change only has to be carried out quickly enough for an observer to no longer be able to separate the colour partial images projected one after another in time, with the result that the observer can discern only the superimposition and thus the multi-coloured image.

The time-sequential generation of the differently coloured illumination light can be carried out in the usual manner, for example by means of a colour wheel 35 (FIG. 1) between the light source 2 and the illumination modulator 3.

Of course, it is also possible to provide, instead of only one illumination modulator, three illumination modulators which are struck simultaneously by red, green and blue light. The red, green and blue on-light of the three modulators is then superimposed and the superimposed on-light is imaged in selected colours onto three image modulators 5 by means of the imaging lens system 4. The image modulators modulate the respective colour partial image which is in turn superimposed and then projected onto the projection surface 8 by means of the imaging lens system 6.

The superimposition and colour separation can be carried out by means of dichroic layers. This embodiment with six modulators is, naturally, much more elaborate than the previously described embodiments. However, a brighter colour image can be produced with such an embodiment.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A projection device, comprising:
a first tilting mirror matrix;
a second tilting mirror matrix, wherein each of the first and second tilting mirror matrixes include a plurality of tilting mirrors and a cover glass covering the tilting mirrors;
an imaging lens system, including a relay lens system which images the tilting mirrors of the first tilting mirror matrix onto the tilting mirrors of the second tilting mirror matrix and thus light reflected by tilting mirrors of the first tilting mirror matrix onto tilting mirrors of the second tilting mirror matrix; and
a projection lens system, which projects light reflected by tilting mirrors of the second tilting mirror matrix, in order to produce an image,
wherein the imaging lens system further includes a correction element which corrects at least one image error caused by the light obliquely passing through the cover glasses, and
wherein the relay lens system is purely reflective.

2. The projection device according to claim 1, wherein the relay lens system is formed as a monocentric optics unit.

3. The projection device according to claim 1, wherein the correction element is formed as a refractive element.

4. The projection device according to claim 3, wherein the refractive correction element is positioned such that it is passed through precisely once by the light imaged from the first tilting mirror matrix onto the second tilting mirror matrix.

5. The projection device according to claim 3, wherein the refractive correction element is positioned such that it is passed through precisely twice by the light imaged from the first tilting mirror matrix onto the second tilting mirror matrix.

6. The projection device according to claim 1, wherein the relay lens system includes a primary mirror with a concave spherical mirror surface and a secondary mirror with a convex spherical mirror surface.

7. The projection device according to claim 1, wherein the correction element is a reflective element.

8. The projection device according to claim 1, wherein the relay lens system is mirror-symmetrical to precisely one symmetry plane.

9. A projection device, comprising:
a first tilting mirror matrix;
a second tilting mirror matrix, wherein each of the first and second tilting mirror matrixes include a plurality of tilting mirrors and a cover glass covering the tilting mirrors;
an imaging lens system, including a relay lens system which images the tilting mirrors of the first tilting mirror matrix onto the tilting mirrors of the second tilting mirror matrix and thus light reflected by tilting mirrors of the first tilting mirror matrix onto tilting mirrors of the second tilting mirror matrix; and
a projection lens system, which projects light reflected by tilting mirrors of the second tilting mirror matrix, in order to produce an image,
wherein the imaging lens system further includes a correction element which corrects at least one image error caused by the light obliquely passing through the cover glasses, and
wherein the relay lens system is a catadioptric lens system.

10. The projection device according to claim 9, wherein the relay lens system is formed as a monocentric optics unit.

11. The projection device according to claim 9, wherein the correction element is formed as a refractive element.

12. The projection device according to claim 11, wherein the relay lens system includes a mirror having a curved mirror surface, the mirror being formed by a metallized side of the refractive element.

13. The projection device according to claim 11, wherein the refractive correction element is positioned such that it is passed through precisely once by the light imaged from the first tilting mirror matrix onto the second tilting mirror matrix.

14. The projection device according to claim 11, wherein the refractive correction element is positioned such that it is passed through precisely twice by the light imaged from the first tilting mirror matrix onto the second tilting mirror matrix.

15. The projection device according to claim 9, wherein the relay lens system includes a primary mirror with a concave spherical mirror surface and a secondary mirror with a convex spherical mirror surface.

16. The projection device according to claim 9, wherein the correction element is a reflective element.

17. The projection device according to claim 9, wherein the relay lens system is mirror-symmetrical to precisely one symmetry plane.

* * * * *